United States Patent
Minami

(10) Patent No.: US 7,497,804 B2
(45) Date of Patent: Mar. 3, 2009

(54) AUTOMATIC GEARSHIFT CONTROL DEVICE AND VEHICLE

(75) Inventor: Kengo Minami, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 415 days.

(21) Appl. No.: 11/513,537

(22) Filed: Aug. 31, 2006

(65) Prior Publication Data

US 2007/0243972 A1  Oct. 18, 2007

(30) Foreign Application Priority Data

Apr. 18, 2006  (JP)  ............................. 2006-114703

(51) Int. Cl.
  *B60W 10/00*  (2006.01)
(52) U.S. Cl. ......................................................... 477/78
(58) Field of Classification Search ........................ None
  See application file for complete search history.

(56) References Cited

U.S. PATENT DOCUMENTS

| | | | |
|---|---|---|---|
| 1,500,878 A | 7/1924 | Kruchten | |
| 5,121,649 A | 6/1992 | Randriazanamparany et al. | |
| 5,634,867 A * | 6/1997 | Mack ............................ | 477/86 |
| H2031 H | 6/2002 | Harrell et al. | |
| 6,481,554 B1 | 11/2002 | Ota | |
| 6,502,681 B1 | 1/2003 | Ota | |
| 7,079,933 B2 * | 7/2006 | Kano et al. .................... | 701/67 |
| 2004/0118652 A1 | 6/2004 | Muetzel et al. | |
| 2006/0094567 A1 | 5/2006 | Kosugi et al. | |
| 2006/0124422 A1* | 6/2006 | Zenno ........................ | 192/3.61 |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |

(Continued)

FOREIGN PATENT DOCUMENTS

DE  4336445 A1  4/1995

(Continued)

OTHER PUBLICATIONS

Co-Pending U.S. Appl. No. 11/514,387, filed Aug. 31, 2006. Title: Cluth Failure Detector, Automatic Clutch System, and Straddle-Type Vehicle.

(Continued)

*Primary Examiner*—Dirk Wright
(74) *Attorney, Agent, or Firm*—Knobbe, Martens, Olson & Bear, LLP

(57) ABSTRACT

A target value of a reduction rate of a difference in clutch rotational number can be set on the basis of a result of detection of a throttle opening sensor and the target value setting table in half-clutch control. Then, the difference in clutch rotational number can be calculated on the basis of an engine rotational number detected by an engine rotational number sensor and a main shaft rotational number calculated on the basis of a driving shaft rotational number detected by a vehicle speed sensor to calculate an actual reduction rate of the difference in clutch rotational number. On the basis of the difference between the set target value and the calculated actual reduction rate, a speed is set for connecting the clutch so that the actual reduction rate would approach the target value.

15 Claims, 16 Drawing Sheets

U.S. PATENT DOCUMENTS

| | | | |
|---|---|---|---|
| 2006/0169562 A1 | 8/2006 | Kosugi | |
| 2006/0169569 A1 | 8/2006 | Ooishi et al. | |
| 2008/0254942 A1* | 10/2008 | Minami | 477/176 |

FOREIGN PATENT DOCUMENTS

| | | |
|---|---|---|
| DE | 19709419 A1 | 10/1997 |
| DE | 19853333 | 6/1999 |
| DE | 10107962 | 8/2002 |
| DE | 10253809 A1 | 11/2002 |
| DE | 10327438 | 1/2004 |
| DE | 10304588 | 4/2004 |
| DE | 10306934 | 9/2004 |
| DE | 10393681 | 10/2005 |
| EP | 0129417 | 12/1984 |
| EP | 0328362 | 8/1989 |
| EP | 0590240 A2 | 4/1994 |
| EP | 0635391 | 1/1995 |
| EP | 0887220 | 12/1998 |
| EP | 0987467 A2 | 3/2000 |
| EP | 1122116 | 8/2001 |
| EP | 1342930 A2 | 9/2003 |
| EP | 1365176 A2 | 11/2003 |
| EP | 1469236 A | 10/2004 |
| EP | 1555461 | 7/2005 |
| EP | 1666772 A | 6/2006 |
| FR | 0 490 730 A1 | 6/1992 |
| GB | 2170571 | 8/1986 |
| JP | 43-11555 | 5/1968 |
| JP | 58-152938 | 9/1983 |
| JP | 60-86631 | 6/1985 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,386, filed Aug. 31, 2006. Title: Clutch Control Device and Vehicle.

Co-Pending U.S. Appl. No. 11/514,000, filed Aug. 31, 2006. Title: Automatic Shift Control Device and Vehicle.

Co-Pending U.S. Appl. No. 11/513,609, filed Aug. 31, 2006. Title: Automated Transmission Controller and Vehicle Including the Automated Transmission Controller.

Co-Pending U.S. Appl. No. 11/514,017, filed Aug. 31, 2006. Title: Automated Transmission Controller and Vehicle Including the Automated Transmission Controller.

Co-Pending U.S. Appl. No. 11/469,268, filed Aug. 31, 2006. Title: Clutch Actuator, Engine Unit, and Straddle Type Vehicle.

Co-Pending U.S. Appl. No. 11/469,310, filed Aug. 31, 2006. Title: Cluth Actuator, Engine Unit, and Straddle Type Vehicle.

Co-Pending U.S. Appl. No. 11/469,228, filed Aug. 31, 2006. Title: Cluth Actuator, Engine Unit, and Straddle Type Vehicle.

Co-Pending U.S. Appl. No. 11/469,252, filed Aug. 31, 2006. Title: Shift Actuator, Vehicle and Method of Integrating Vehicle.

Co-Pending U.S. Appl. No. 10/591,285, filed Aug. 31, 2006. Title: Riding Type Vehicle.

Co-Pending U.S. Appl. No. 10/591,560, filed Aug. 31, 2006. Title: Speed Change Controller for Straddle-Ride Type Vehicles.

Co-Pending U.S. Appl. No. 10/591,559, filed Aug. 31, 2006. Title: Shift Control Device for Straddle-Type Vehicle, and Straddle-Type Vehicle.

Co-Pending U.S. Appl. No. 10/591,284, filed Aug. 31, 2006. Title: Actuation Force Transmission Mechanism and Straddle-Type Vehicle.

EPO European Search Report for EP 06025982, completed Feb. 6, 2007.

EPO European Search Report for EP 06025981, completed Feb. 16, 2007.

EPO European Search Report for EP 06025877, completed Feb. 12, 2007.

EPO European Search Report for EP 06025734, completed Feb. 8, 2007.

EPO European Search Report for EP 06025732, completed Feb. 9, 2007.

EPO European Search Report for EP 06025609, completed Feb. 5, 2007.

EPO European Search Report for EP 06025607, completed Feb. 5, 2007.

EPO European Search Report for EP 06025606, completed Feb. 5, 2007.

* cited by examiner

AUTOMATIC GEARSHIFT CONTROL DEVICE AND VEHICLE

CROSS-REFERENCE TO RELATED APPLICATIONS

This application claims the priority benefit of Japanese Patent Application No. 2006-114703, which was filed on Apr. 18, 2006 and which is hereby incorporated by reference in its entirety.

BACKGROUND OF THE INVENTIONS

1. Field of the Inventions

The present inventions relate to an automatic gearshift control device for automatically shifting gears and to a vehicle provided with the automatic gearshift control device.

2. Description of the Related Art

Recently, vehicles with electronically actuated manual transmissions have become commercially available. These transmissions are largely the same as any conventional manual transmission, except electronic actuators have been added to allow the otherwise manual transmission to be operated electronically.

The actuators are used to automate certain operations so that the system can automate a series of start, stop and shift change operations (clutch disengagement, gear change, and clutch engagement) based on the rider's intention or the state of the vehicle.

One known such vehicle design includes an automatic gearshift control device (for controlling a manual type transmission) which controls operation of the friction clutch of the transmission and controls gearshifts of a transmission by means of an electrically driven actuator. For example, Japanese Patent Document JP-A-2001-146930 discloses an automatic gearshift control device in which the half-clutch (e.g., while the clutch is "slipping") control of the clutch is accomplished with an actuator and is based on a difference in clutch rotational number. This clutch rotational number represents a difference in number of rotation between a driving side and a driven side of a friction clutch, such that the speed for connecting the friction clutch is changed based on this difference.

SUMMARY OF THE INVENTIONS

An aspect of at least one of the embodiments disclosed herein includes the realization that the method in which the speed for connecting the friction clutch is changed in the half-clutch control in accordance with the difference in clutch rotational number suffers from problems. Firstly, in some cases, there are individual variations of the friction clutches among a plurality of vehicles when a friction clutch is used, and thereby, a coefficient of friction between friction members of the friction clutch is different among the vehicles. Further, wear of the friction clutch, a change or deterioration of engine oil or such sometimes causes a variation in coefficient of friction between friction members of the friction clutch even in the case of the same vehicle. Such a difference or change in coefficient of friction, however, causes a change in feeling in connection of a friction clutch, and thereby, deterioration in feeling in a ride when the conventional method is used. Second, in the case that an accelerator is operated during the half-clutch, the vehicle speed does not increase in accordance with the rider's expectations, thereby providing an uncomfortable feeling for the rider.

Thus, in accordance with an embodiment, an automatic gearshift control device can comprise a friction clutch provided between a driving side power transmission mechanism and a driven side power transmission mechanism and a transmission. An automatic gearshift device can include an electrically-driven actuator configured to control engagement of the friction clutch and for shifting gears of the transmission. A reduction rate obtaining device can be configured to obtain a reduction rate of a difference in clutch rotational number defined on the basis of a difference between the driving side rotational number and the driven side rotational number, the driving side rotational number being a rotational number of a driving side part of the friction clutch or the driving side power transmission mechanism and the driven side rotational number being a rotational number of a driven side part of the friction clutch or the driven side power transmission mechanism. A connecting speed setting device can be configured to set a speed for connecting the friction clutch so that the reduction rate of the difference in clutch rotational number, the reduction rate being obtained by means of the reduction rate obtaining device, would reach a predetermined target value. Additionally, a control device can be configured to control drive of the actuator so as to connect the friction clutch at the connection speed set with the connecting speed setting device.

In accordance with another embodiment, an automatic gearshift control device can be mounted to a vehicle including an engine. The automatic gearshift control device can comprise a friction clutch, a transmission, and an automatic gearshift device including an electrically-driven actuator configured to control engagement of the friction clutch and configured to shift gears of the transmission. A rotational number reduction rate obtaining device can be configured to obtain the reduction rate of the engine rotational number and a connecting speed setting device can be configured to set a speed for connecting the friction clutch so that the reduction rate of the engine rotational number obtained by the rotational number reduction rate obtaining device would reach a predetermined target value. A control device can be configured to control drive of the actuator so as to connect the friction clutch at the connection speed set by means of the connecting speed setting device.

BRIEF DESCRIPTION OF THE DRAWINGS

These and other features, aspects and advantages will now be described with reference to drawings of a preferred embodiment. The drawings comprise the following figures.

DETAILED DESCRIPTION OF THE PREFERRED EMBODIMENTS

Figure 1:
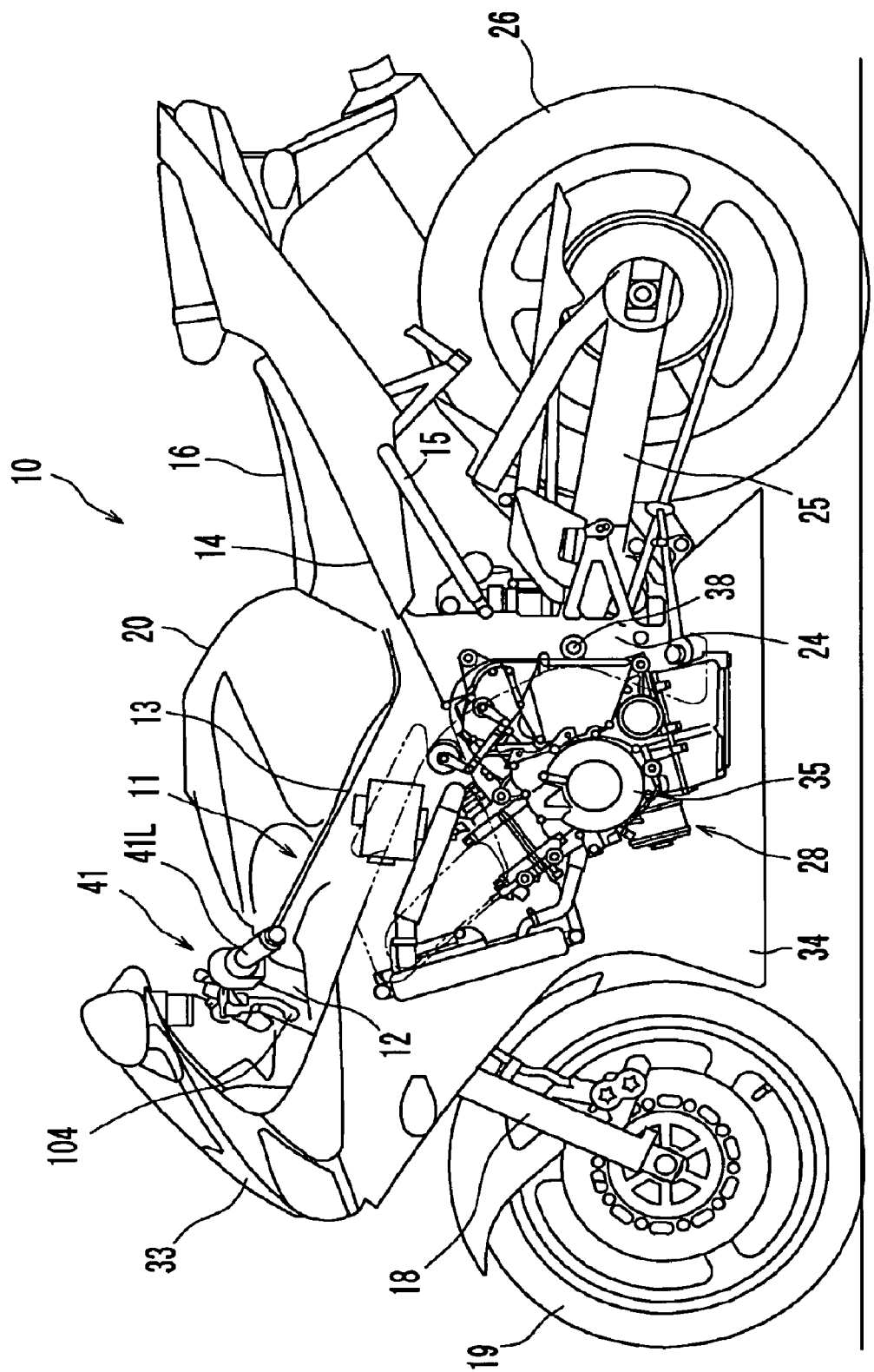
FIG. 1 is a side elevational view of a motorcycle constructed in accordance with an embodiment.

FIG. 1 is a side view of a motorcycle 1 having a transmission arranged and configured in accordance with an embodiment. The transmission is disclosed in the context of a motorcycle because it has particular utility in this context. However, the transmission can be used in other contexts, such as, for example, but without limitation, scooters, automobiles, as well as other vehicles.

With continued reference to FIG. 1, the motorcycle 10 includes a vehicle body frame 11 defining a framework, and a seat 16 on which a rider sits. The seat 16 is configured such that the rider straddles the seat, astride the vehicle body frame 11, during operation.

The shape of the motorcycle 10 is not limited to that shown in FIG. 1, nor are the maximum speed, displacement volume, size, and other conditions of the vehicle limited thereto. Additionally, the inventions disclosed herein are not limited to a so-called motorcycle-type two-wheel vehicle which includes a fuel tank before the seat, but are applicable to other types of two-wheel vehicles. Moreover, the inventions disclosed herein are not limited to two-wheel vehicles, but may be used with other types of saddle-type vehicle. Furthermore, the inventions disclosed herein are not limited to saddle-type vehicles, but can also be used with other types of vehicles such as four-wheel buggy for two riders.

In the following description, the front-and-rear direction and the left-and-right direction are defined as viewed by the rider sitting on the seat 16.

With continued reference to FIG. 1, the vehicle body frame 11 can have a steering head pipe 12, a main frame 13 extending diagonally downward to the rear from the steering head pipe 12, left and right seat rails 14 extending diagonally upward to the rear from the intermediate position of the main frame 13, and left and right seat pillar tubes 15 connected with the rear end of the main frame 13 and the intermediate positions of the seat rails 14.

A front wheel 19 can be supported by the steering head pipe 12 via a front fork 18. A fuel tank 20 and the seat 16 can be supported on the seat rails 14. The seat 16 can extend from above the fuel tank 20 toward the rear ends of the seat rails 14. The fuel tank 20 can be disposed above the front half parts of the seat rails 14.

A pair of left and right rear arm brackets 24 can be provided at the rear end of the main frame 13. In this embodiment, the rear arm brackets 24 and other components provided on the main frame 13 can be considered as forming a part of the vehicle body frame 11. However, other configurations can also be used.

The rear arm brackets 24 project downwardly from the rear end of the main frame 13. Pivot shafts 38 can be equipped on the rear arm brackets 24, and the front ends of rear arms 25 can be supported by the pivot shafts 38 such that the rear arms 25 can freely swing. A rear wheel 26 can be supported by the rear ends of the rear arms 25.

An engine unit 28 for driving the rear wheel 26 can be supported by the vehicle body frame 11. A crank case 35 can be supported by the main frame 13 in such a manner as to be suspended therefrom. In some embodiments, a gasoline engine (not shown) can be provided in the engine unit 28. However, the engine included in the engine unit 28 is not limited to an internal combustion engine such as a gasoline engine, but may be an electric motor, a hybrid gasoline, electric system, or other types of propulsion systems.

The motorcycle 10 can also include a front cowl 33 and left and right leg shields 34. The leg shields 34 can cover components covering the front parts of the rider's legs. However, other configurations can also be used.

Though not shown in FIG. 1, a brake pedal can be equipped in the lower right area of the motorcycle 10. The brake pedal can be a component for braking the rear wheel 26. The front wheel 19 can be braked by operating a brake lever (not shown) provided in the vicinity of a right grip 41R (see FIG. 2) of a handlebar 41.

A clutch lever 104 can be disposed in the vicinity of a left grip 41L of the handlebar 41. In some such embodiments, engagement and disengagement of the clutch can be effected also by operating the clutch lever 104 as well as automatically, described in greater detail below.

Figure 2:
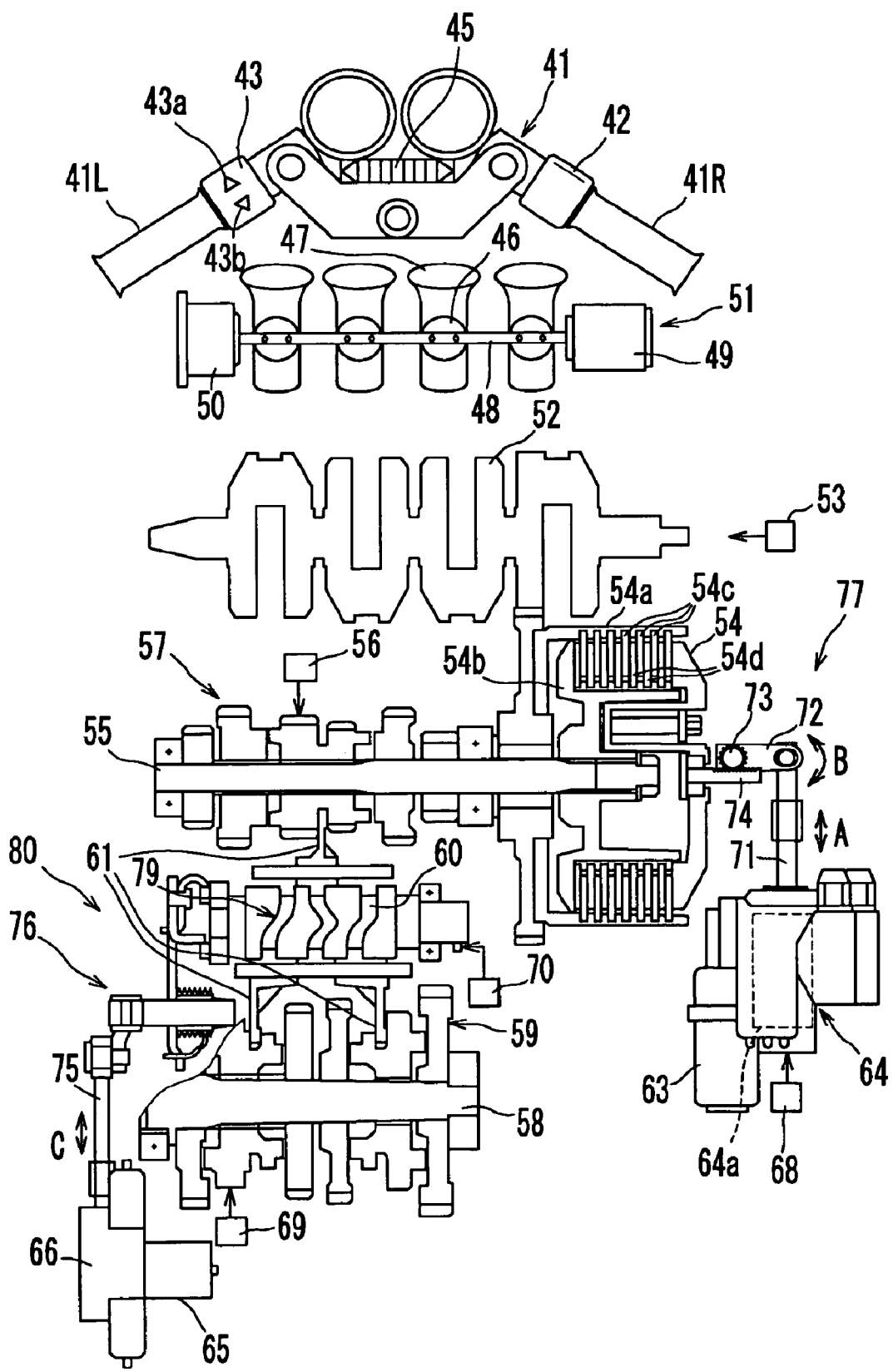
FIG. 2 is a partial exploded and schematic view of a drive system of the motorcycle shown in FIG. 1, the drive system including a transmission.

FIG. 2 illustrates a structure of a driving system that can be used with the motorcycle shown in FIG. 1. In some embodiments, the right grip 41R of the handlebar 41 (see also FIG. 1) comprises a rotatable accelerator grip. A throttle input sensor 42 can be attached to the accelerator grip.

The throttle input sensor 42 can be configured to detect acceleration input (throttle opening input) given by the rider, which can also be referred to as a torque request or power output request. A shift switch 43 can be disposed on the left grip 41L of the handlebar 41, although other locations can also be used.

With continued reference to FIG. 2, the shift switch 43 can include a shift-up switch 43a and a shift-down switch 43b, thereby giving the operator a device for requesting increases and decreases in the gear position. For example, in some embodiments, the motorcycle can be shifted in the range between the neutral position and the maximum gear position (e.g., 6 gear positions in an exemplary but non-limiting embodiment) by manual operation. An indicator 45 can be configured to display the current shift position or the like can be provided at the center of the handlebar 41.

Throttle valves 46 can be attached to throttles bodies 47, which can be considered as forming an air intake passages. A throttle drive actuator 49 can be attached to one end (the right end in the illustrated embodiment) of a valve shaft 48 to which the throttle valves 46 can be rotatably connected. A throttle opening sensor 50 can be attached to the other end (the left end in the illustrated embodiment) thereof. The throttle drive actuator 49 and the throttle opening sensor 50 attached to the valve stem 48 can be considered as forming a DBW (drive by wire) 51 system. However, other configurations can also be used and considered as forming a drive by wire system. The DBW 51 can be configured to open and close the throttles 47 through the throttle drive actuator 49 based on the detection results from the throttle opening sensor 50, as well as other calculations and/or determinations, described in greater detail below.

An engine revolution sensor 53 can be configured to detect rotation of the crankshaft 52. In the illustrated embodiment, the engine revolution sensor 53 is disposed on the right side of a crankshaft 52. However, other positions can also be used.

The crankshaft 52 can be connected to a main shaft 55 via a wet multi-disc-type clutch 54, although other types of clutches can also be used. The clutch 54 can have a clutch housing 54a and a clutch boss 54b. A plurality of friction plates 54c can be attached to the clutch housing 54a, and a plurality of clutch plates 54d can be attached to the clutch boss 54b. Each of the clutch plates 54d can be interposed between the adjoining friction plates 54c, 54c. As noted above, other types of clutches can also be used, including, but without limitation, a dry clutch or a single-plate-type clutch.

The main shaft 55 can have multiple-position (six positions in FIG. 2) transmission gears 57 and a main shaft revolution sensor 56. Each of the transmission gears 57 attached to the main shaft 55 can engage with a corresponding transmission gears 59 attached onto a drive shaft 58 disposed parallel with the main shaft 55. In FIG. 2, the transmission gears 57 and the transmission gears 59 are separated so as to simplify the explanation.

The transmission gears 57, 59 are attached such that either or both of the gears 57, 59, other than the selected gears, are attached to the main shaft 55 or drive shaft 58 during idling of the engine. Thus, driving force can be transmitted from the main shaft 55 to the drive shaft 58 only through a selected pair of the transmission gears. The condition in which the pair of the transmission gears 57 and 59 engage with each other and transmit driving force from the main shaft 55 to the drive shaft 58 is referred to as "gear-in" condition or the "gear position".

The operation for selecting or meshing the desired pair of transmission gears 57 and transmission gears 59 and changing between such pairs can be performed with a shift cam 79. The shift cam 79 can have a plurality of cam grooves 60 (three grooves are illustrated in FIG. 2, although other numbers of grooves can also be used), and shift forks 61 are attached to the respective cam grooves 60.

The respective shift forks 61 engage with the predetermined transmission gears 57 and 59 of the main shaft 55 and drive shaft 58. When the shift cam 79 rotates, the shift forks 61 move along the cam grooves 60 in the axial direction and accordingly the predetermined transmission gears 57, 59 engaging with the splines of the main shaft 55 and drive shaft 58 move in the axial direction. Then, the transmission gears 57, 59 having moved in the axial direction engage with another pair of the transmission gears 57, 59 attached to the main shaft 55 and drive shaft 58 in idling condition to complete the gear change process. The transmission gears 57, 59 and the shift cam 79 can be considered as forming a transmission 80, although other configurations can also be used to form the transmission 80.

Figure 3:
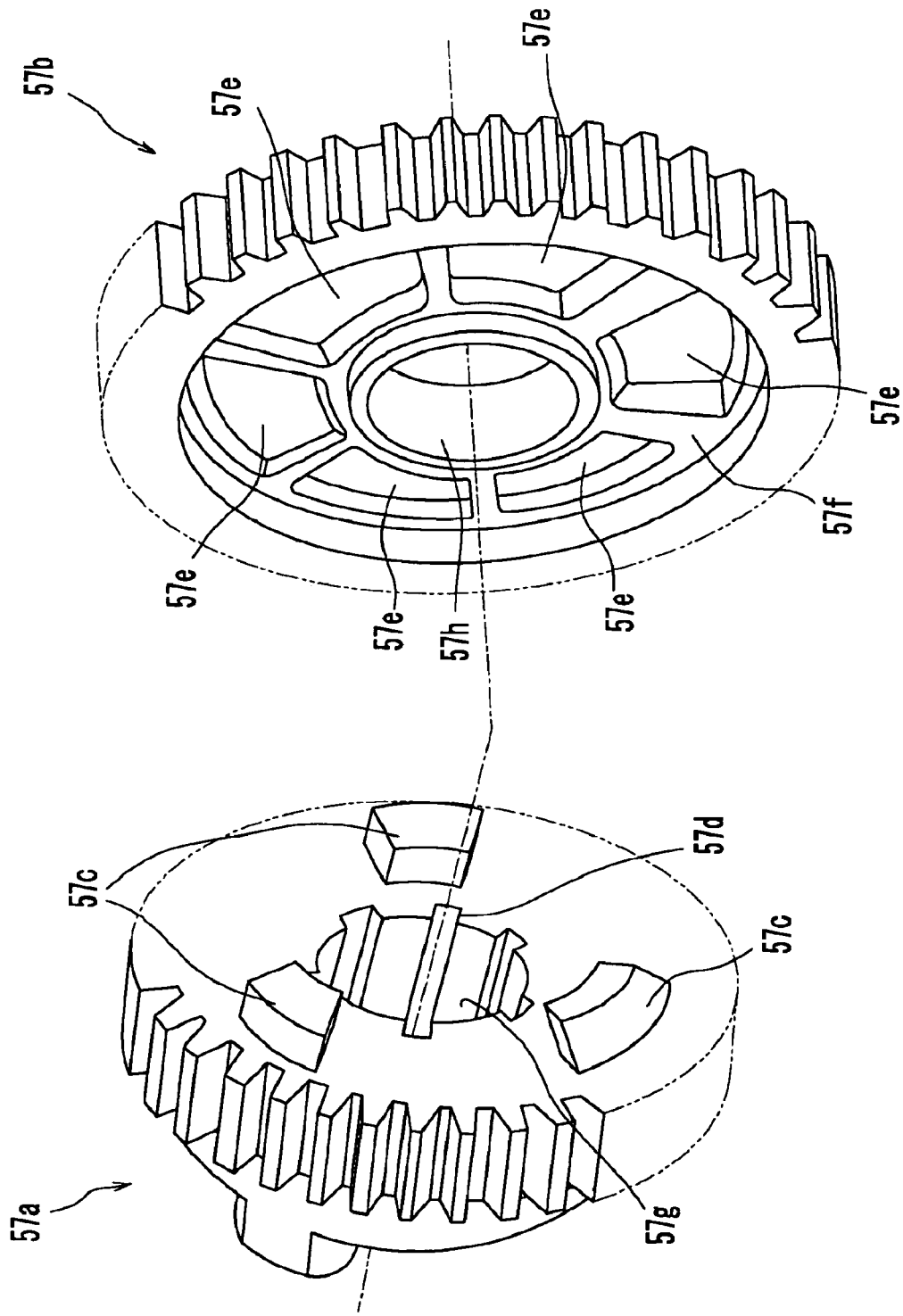
FIG. 3 is a perspective view of two gears that can be used in the transmission of FIG. 2.

The transmission 80 can be a dog-clutch-type transmission. As illustrated in FIG. 3, each of the transmission gears 57 of the transmission 80 has a first gear 57a having engaging projections 57c on an axial end surface thereof, and a second gear 57b having engaging concaves 57e on its axial end surface opposed to the engaging projections 57c. The transmission 80 can include a plurality of first gears 57a and second gears 57b. Also, the transmission 80 can include a plurality of first gears having engaging projections and a plurality of second gears having engaging concaves as the transmission gears 59. Since these structures of the transmission gears 59 are similar to those of the first gears 57a and second gears 57b shown in FIG. 3, explanation of the transmission gears 59 is not repeated herein.

Each of the first gears 57a has the three engaging projections 57c disposed at equal intervals on the outer edge of its axial end surface in the circumferential direction. Each of the second gears 57b has the six engaging concaves 57e also disposed at equal intervals in the circumferential direction. However, other numbers of projections 57c and concaves 57e can also be used.

An insertion hole 57g through which the main shaft 55 and the drive shaft 58 are inserted is formed at the axial center of the first gear 57a. A plurality of grooves 57d are provided along the circumference of the insertion hole 57g. The first gear 57a engages with the splines of the main shaft 55 and the drive shaft 58. The second gear 57b has an insertion hole 57h through which the main shaft 55 and the drive shaft 58 are inserted, but the insertion hole 57h does not have grooves around the hole. Thus, the second gear 57b can be attached to the main shaft 55 and the drive shaft 58 in idling condition.

When the shift cam 79 (FIG. 2) rotates, the shift forks 61 move along the cam grooves 60 and accordingly, the first gear 57a moves along the splines of the main shaft 55 and the drive shaft 58 in the axial direction. Then, the engaging projections 57c of the first gear 57a come to engagement with the engaging concaves 57e of the second gear 57b, thereby changing the combination of the transmission gears 57, 59 for transmitting the driving force from the main shaft 55 to the drive shaft 58 and completing the gear change process.

Additionally, when the shift cam 79 (FIG. 2) rotates, the first gear 57a moves in the axial direction. At this step, the engaging projections 57c of the first gear 57a do not engage with the engaging concaves 57e of the second gear 57b but contact an axial end face 57f of the second gear 57b in dog-contact condition in some cases. Under the dog-contact condition, the first gear 57a and second gear 57b do not engage but contact with each other, failing to securely attain gear change.

As illustrated in FIG. 2, the clutch 54 and the transmission 80 can be operated by a clutch actuator 63 and a shift actuator 65, respectively. The clutch actuator 63 can be connected with the clutch 54 via a hydraulic transmission mechanism 64, a rod 71, a lever 72, a pinion 73, and a rack 74.

The hydraulic transmission mechanism 64 can also include a hydraulic cylinder 64a, an oil tank (not shown), a piston (not shown) and other components. The hydraulic transmission mechanism 64 can also be configured to generate hydraulic pressure by the operation of the clutch actuator 63 and transmits the hydraulic pressure to the rod 71. The rod 71 thus reciprocates in the direction indicated by an arrow A by the operation of the clutch actuator 63, thereby rotating the lever 72 in the direction indicated by an arrow B. As a result, the clutch 54 can be connected or disconnected in accordance with the movement direction of the rack 74. While an electric motor can be used as the clutch actuator 63 in some embodiments, other devices such as a solenoid and an electromagnetic valve, or other actuators can also be used.

An automatic gearshift control device can comprise the transmission 80, the shift actuator 65, a deceleration mechanism 66, a rod 75, a link mechanism 76, an ECU 100 (FIG. 4) for controlling the operations of the clutch actuator 63 and shift actuator 65. However, other configurations can also be used. An automated clutch device 77 can comprise the clutch 54, the clutch actuator 63, the hydraulic transmission mechanism 64, the rod 71, the lever 72, the pinion 73, and the rack 74. However, other configurations can also be used.

The shift actuator 65 can be connected with the shift cam 79 via the deceleration mechanism 66, a spring 85, the rod 75, and the link mechanism 76. The deceleration mechanism 66 can have a plurality of reduction gears (not shown).

At the time of gear change, the rod 75 reciprocates in the direction indicated by an arrow C by the operation of the shift actuator 65, and the shift cam 79 rotates through a predetermined angle via the link mechanism 76. Then, the shift forks 61 move along the cam grooves 60 by a predetermined amount in the axial direction. As a result, a pair of the transmission gears 57, 59 are fixed to the main shaft 55 and the drive shaft 58, respectively, and thus driving force can be transmitted from the main shaft 55 to the drive shaft 58. While an electric motor can be used as the shift actuator 65 in some embodiments, other devices such as solenoid, an electromagnetic valve, or other devices can also be used.

The hydraulic transmission mechanism 64 connected with the clutch actuator 63 can include a clutch position sensor 68 for detecting a position of the clutch (e.g., a distance between the friction plates 54*c* and the clutch plates 54*d*) based on the detection of the stroke position of the piston. While the clutch position can be detected by the clutch position sensor 68 which detects the stroke position of the piston in some embodiments, the clutch position may be detected based on the detection of the position of the transmission mechanism provided between the clutch actuator 63 and the clutch 54.

For example, the clutch position can be detected based on the detection of the position of the rod 71 or the rack 74. The detection of the clutch position is not limited to indirect detection based on the detected stroke position of the piston as in the illustrated embodiment, but can be through direct measurement of the distance between the friction plates 54*c* and the clutch plates 54*d* using a sensor (not shown).

The drive shaft 58 can have a vehicle speed sensor 69. The shift cam 79 can have a gear position sensor 70 configured to detect the gear position (e.g., a rotational position of the shift cam 79).

The ECU 100 (engine control unit) can be configured to control the operations of the clutch actuator 63 and the shift actuator 65 in accordance with the operation of the shift-up switch 43*a* or the shift-down switch 43*b* to execute shift change. For example, the ECU 100 can be configured to execute a sequential processes involving starting gear change of the transmission gears 57, 59 by the shift actuator 65, disconnecting the clutch 54 by the clutch actuator 63 after elapse of a predetermined time from the start of gear change, and connecting the clutch 54 by the clutch actuator 63, in this order, under a predetermined program or a map at the time of running of the vehicle. However, the ECU 100 can be configured to execute other gear changing processes as well as other operations for the operation of the motorcycle 10.

Figure 4:
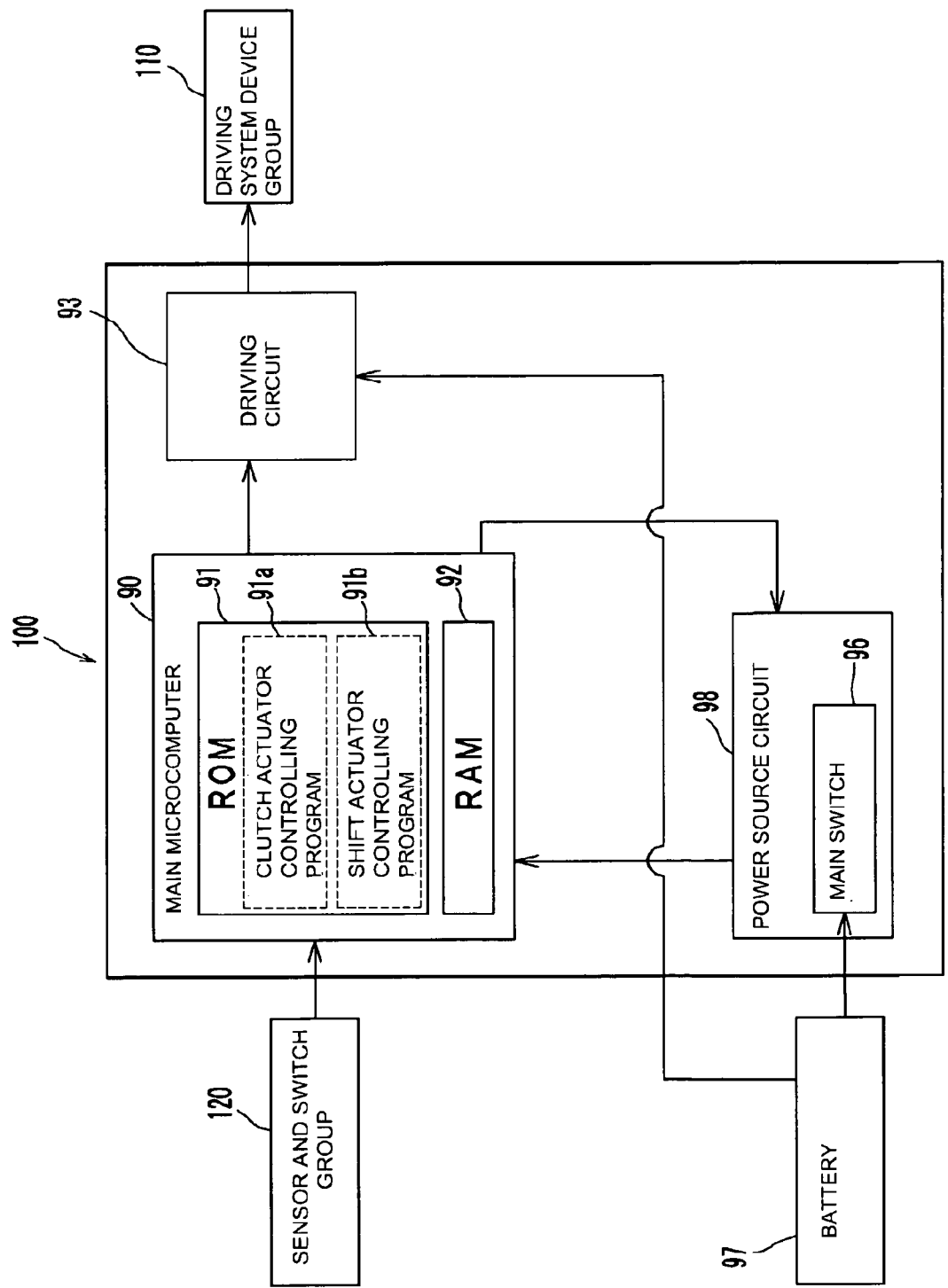
FIG. 4 is a block diagram illustrating a control system that can be used with the motorcycle of FIG. 1.

FIG. 4 is a block diagram illustrating an exemplary structure of a gear change controller that can be provided on the motorcycle 10 for performing gear changes. A drive system group 110 can be connected with a main microcomputer 90 contained in the ECU 100 via a drive circuit 93.

The ECU 100 can be considered as forming a control unit or a gear change controller. However, the gear change controller disclosed herein can also be constructed in other ways. For example, the gear change controller can be in the form of one or a plurality of hard-wired feedback control circuits. Alternatively, the gear change controller can be constructed of a dedicated processor and a memory for storing a computer program configured to perform the control routine of FIG. 7. Additionally, the gear change controller can be constructed of a general purpose computer having a general purpose processor and the memory for storing the computer program for performing the routine of FIG. 7. Preferably, however, the gear change controller is incorporated into the ECU 100, in any of the above-mentioned forms.

Figure 5:
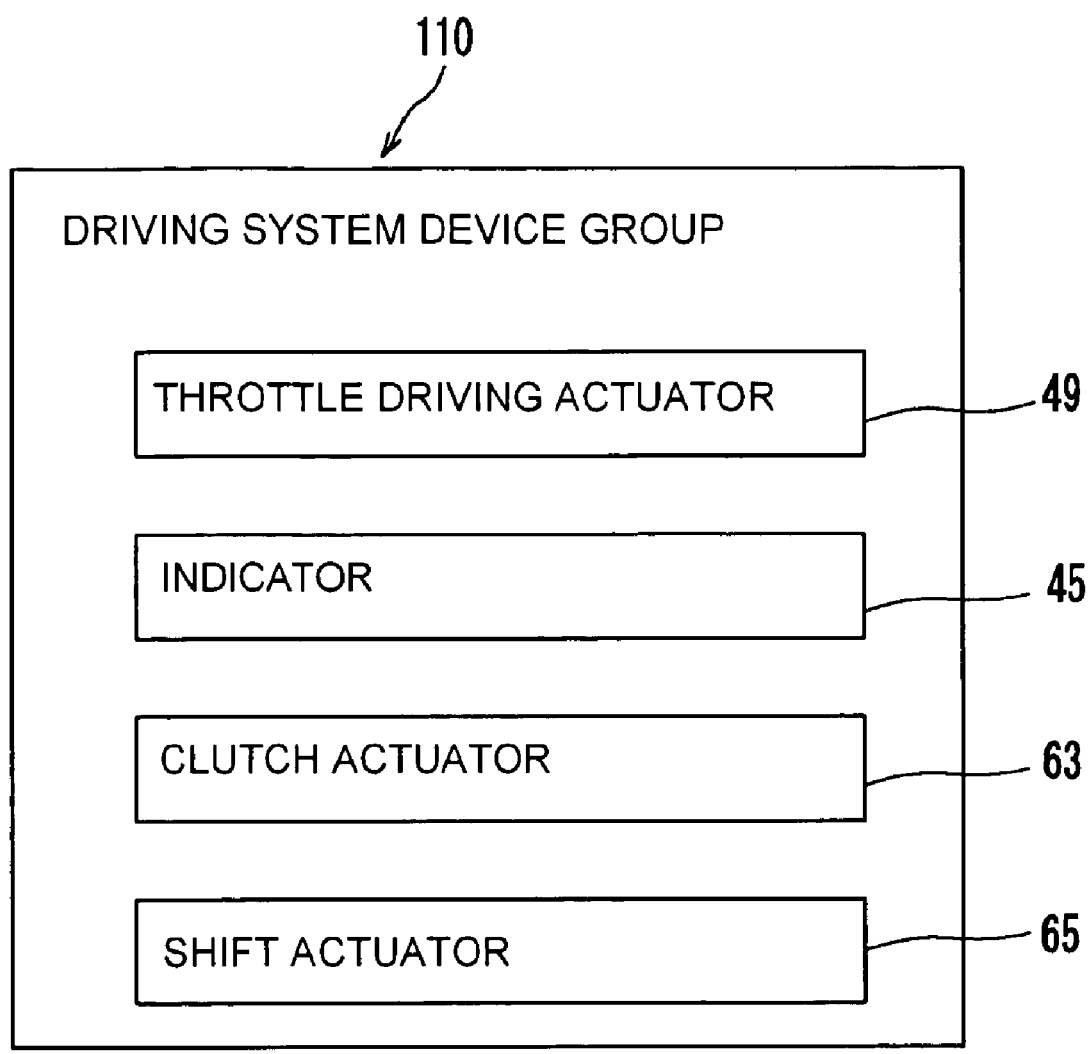
FIG. 5 is a block diagram illustrating a drive system group that can be use with the control system of FIG. 4.

As shown in FIG. 5, the drive system group 110 can include the throttle drive actuator 49, the indicator 45, the clutch actuator 63, and the shift actuator 65 (see also FIG. 2). The drive circuit 93 can be configured to supply appropriate electric current to the respective devices of the drive system group 110 from a battery 97 in response to drive signals sent from the main microcomputer 90. A sensor and switch group 120 can be connected with the main microcomputer 90.

Figure 6:
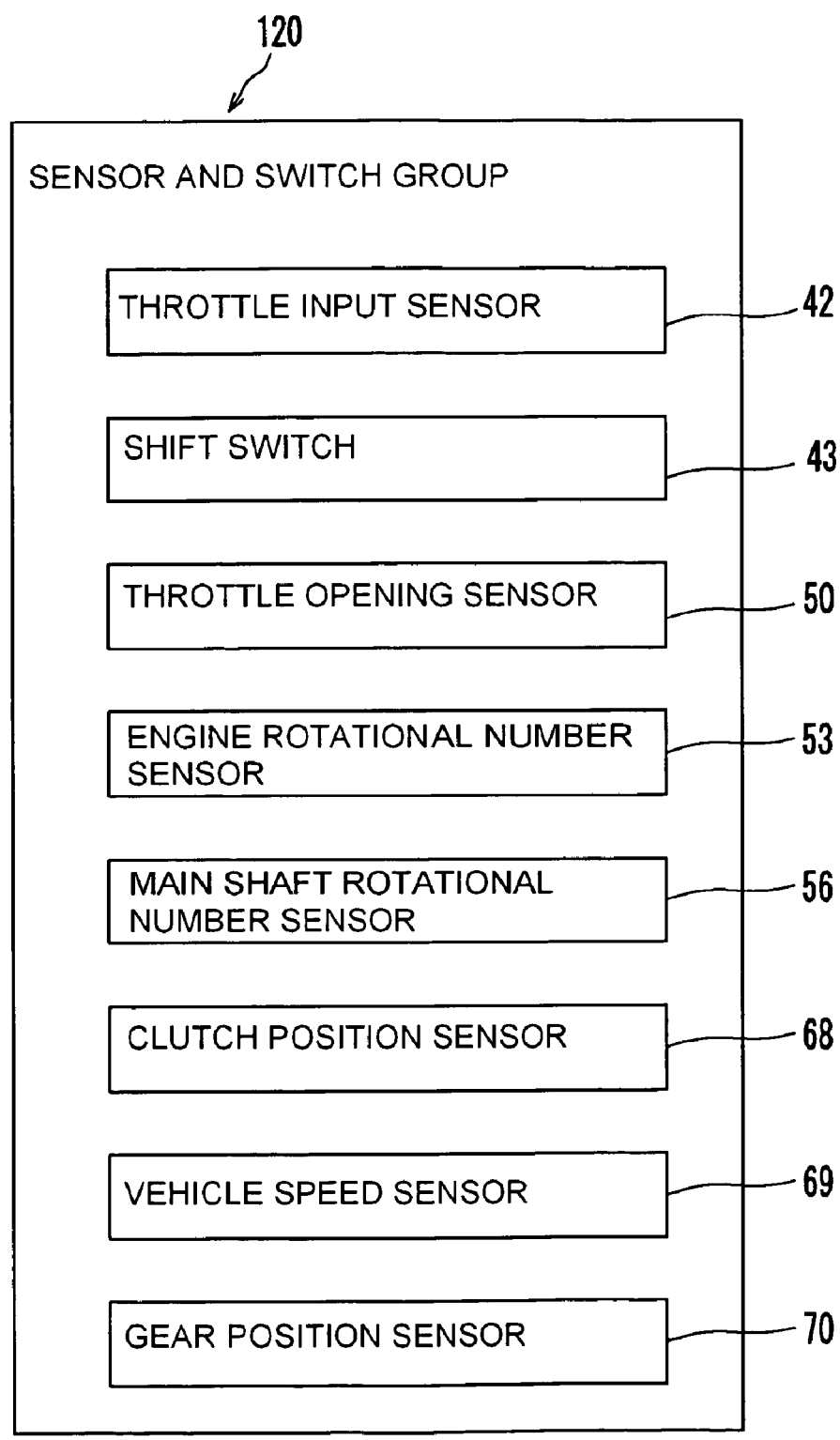
FIG. 6 is a block diagram illustrating a sensor and switch group that can be use with the control system of FIG. 4.

As shown in FIG. 6, the sensor and switch group can be constituted by the throttle input sensor 42, the shift switch 43, the throttle opening sensor 50, the engine revolution sensor 53, the main shaft revolution sensor 56, the clutch position sensor 68, the vehicle speed sensor 69, and the gear position sensor 70 (see also FIG. 2), as well as other sensors. The detection results from the respective sensors can be input to the main microcomputer 90, and then the main microcomputer 90 can supply drive signals to the respective devices constituting the drive system group 110 based on the detection results obtained from the respective sensors to control the operations of these devices.

The main microcomputer 90 can have a ROM 91 and a RAM 92. The ROM 91 can be used to store a clutch actuator control program 91*a* and a shift actuator control program 91*b*. The clutch actuator control program 91*a* can be a program for controlling the operation of the clutch actuator 63. The shift actuator control program 91*b* can be a program for controlling the operation of the shift actuator 65. The ROM 91 can be constructed in a manner that makes it is impossible for a user to delete these programs stored in the ROM 91, or to write new programs or the like to the ROM 91. However, other types of memory can also be used.

For executing the clutch actuator control program 91*a* or the shift actuator control program 91*b,* either of these programs can be loaded into the RAM 92 and read by the main microcomputer 90. Then, the main microcomputer 90 controls the operation of the clutch actuator 63 or the shift actuator 65 under the program in the RAM 92.

A power source circuit 98 connected with the battery 97 can have a main switch 96 which can be turned on or off in accordance with the operation of a key switch (not shown). When the main switch 96 is turned on, the power source circuit 98 converts voltage of the battery 97 into driving voltage for the main microcomputer 90 and supplies the converted voltage to the main microcomputer 90.

Figure 7:
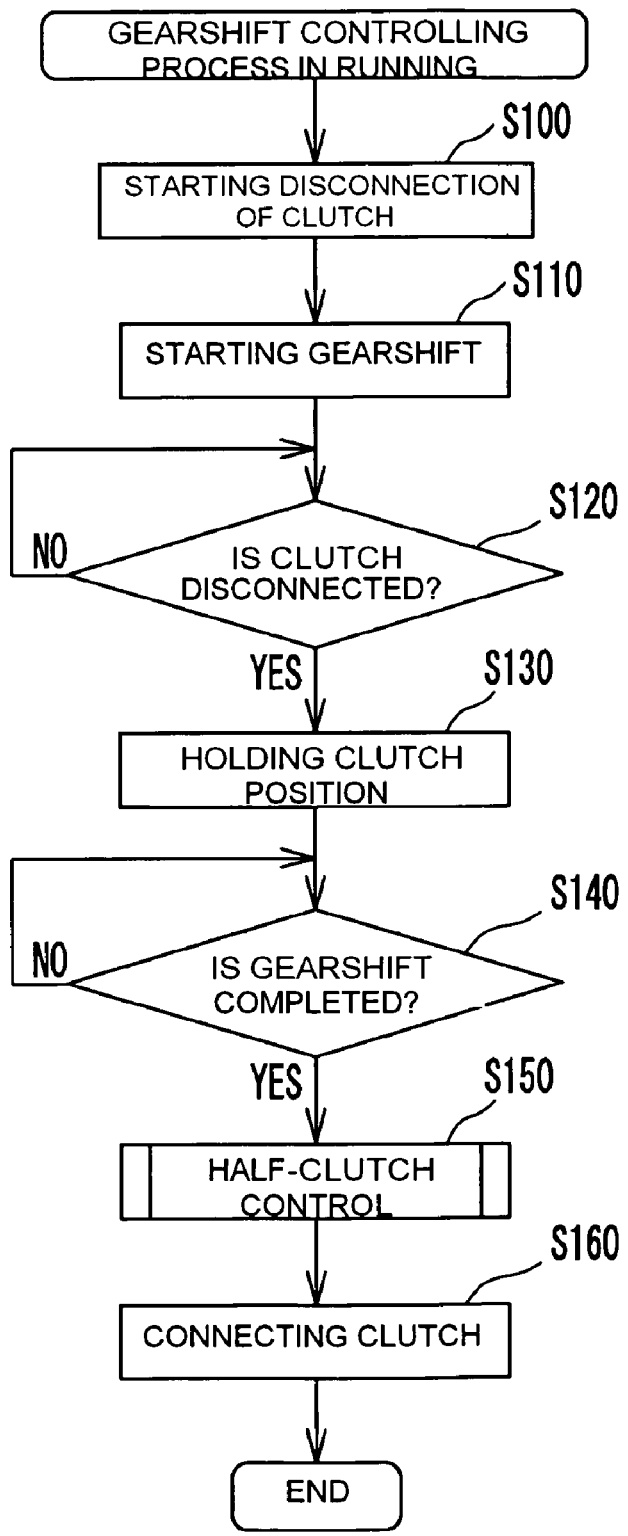
FIG. 7 is a flowchart showing a gearshift controlling process that can be used to control the transmission, such as the transmission in the motorcycle of FIGS. 1-6.

FIG. 7 illustrates a control routine that can be used for shifting gears of the motorcycle 10 (a shift-up operation or a shift-down operation) during operation. The gearshift controlling process of FIG. 7 can be a separate control routine, a sub routine, or it can part of a main control routine used for controlling other aspects of the operation of the motorcycle 10. The control routine of FIG. 7 can be executed when a gearshift operation is carried out during operation of a vehicle such as the motorcycle 10, for example, when the shift-up switch 43*a* or the shift-down switch 43*b* is operated.

During execution of the control routine of FIG. 7, firstly, the ECU 100 can start disconnection of the clutch 54. For example, the ECU 100 can supply the clutch actuator 63 with a driving signal to make the clutch actuator 63 disconnect the clutch 54. In some embodiments, the clutch 54 can be disconnected at a specific speed.

After the process in Step S100 is executed, a gearshift process can be started in Step S110. For example, the ECU 100 can wait until a predetermined time has passed from a time of starting disconnection of the clutch 54 in Step S100, and then the ECU 100 can supply the shift actuator 65 with a driving signal and to thereby cause the shift actuator 65 to start a gearshift of the transmission gears 57 and 59. As noted above, the gears can be moved as such by rotation of the shift cam 79. After the process in Step S110 is executed, the control routine can move on to Step S120.

In the Step 120, it can then be judged whether the clutch 54 is disconnected or not. For example, the ECU 100 can determine whether the clutch position of the clutch 54 is disconnected or not on the basis of a result of the detection by the clutch position sensor 68 (FIG. 2). When it is judged that the clutch 54 is not disconnected, the process returns to Step S120 until the clutch 54 is disconnected. On the other hand, if the clutch 54 is judged to be disconnected in Step S120, the routine moves on to Step 130.

In the Step 130, a process for holding the position of the clutch can be performed. For example, the ECU 100 can execute a process for holding the position of the clutch 54 judged to be disconnected in Step S120. This process allows the disconnected clutch 54 to be held as it is. After Step 130, the routine moves on to Step S140

In the Step S140, it can be judged whether the gearshift is completed or not. For example, the ECU 100 can determine whether the gearshift is completed or not on the basis of a result of the detection by means of the gear position sensor 70. In the case that the gearshift is not completed, the process is returned to Step S140 to wait until the gearshift is completed.

On the other hand, if it is judged that the gearshift is completed in Step S140, the control routine can move on to Step S150.

In the Step S150, half-clutch control can be performed. An example of half-clutch control that can be performed in this step is described below with reference to FIG. 8. The gear shift control and process can be considered as complete at the end of the Step as 150. After the Step S150, the control routine can move on to Step S160.

In the Step as 160, the clutch can then be connected. For example, the ECU 100 can supply the clutch actuator 63 with a driving signal to cause the clutch actuator 63 to connect the clutch 54. In some embodiments, the clutch 54 can be connected at a specific speed.

Figure 8:
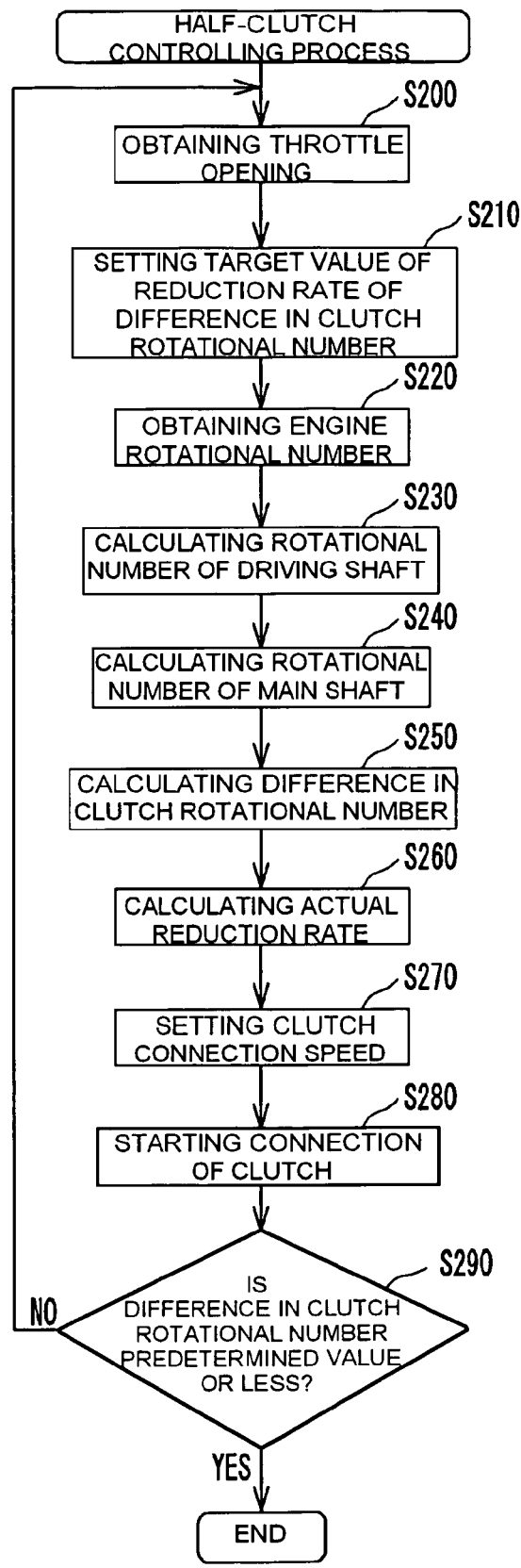
FIG. 8 is a flowchart showing a half-clutch control process that can be used for the process of Step S150 in the flowchart shown in FIG. 7.

FIG. 8 is a flowchart showing an example of a process that can be used to perform the function identified above with reference to Step S150, as the half-clutch controlling process. When the half-clutch controlling process is started, a process for obtaining a throttle opening can be performed in Step S200. For example, the ECU 100 can obtain a result of the detection by means of the throttle opening sensor 50 (FIG. 2). After the Step S200, the control routine moves on to a Step S210.

In the Step S210, a target value of a reduction rate of a difference in clutch rotational number can then be set. The difference in clutch rotational number can be determined as a difference between the number of rotation on the driving side of the clutch 54 and the number of rotation on the driven side of the clutch 54. As used herein, the term rotational number or number of rotation can be measured as revolutions per minute (RPM), degrees per second, radians per second, or any other manner for measuring rotation. Further, the terms "number of rotation on the driving side of the clutch 54" or "the rotational number on the driving side" can be based on the number of whole or partial rotations of the driving side part of the clutch 54 or a power transmitting mechanism closer to the driving side than the clutch 54. The terms "number of rotation on the driven side of the clutch 54" or "the rotational number on the driven side" can be based on the number of whole or partial rotations of the driven side part of the clutch 54 or a power transmitting mechanism closer to the driven side than the clutch 54. In some embodiments, in determining these values, the number of whole or partial rotations can be counted, detected, or sensed over a predetermined amount of time.

In some embodiments, the difference in clutch rotational number is defined to be a difference between the rotational number of the clutch housing 54*a* and the rotational number of the clutch boss 54*b* in the clutch 54. For example, the ECU 100 can perform a process of setting a target value of a reduction rate of a difference in clutch rotational number (also referred to as a target value simply, hereinafter). In some embodiments, the target value can be a target value stored in a storing device in advance. For example, the target value is set on the basis of a target value setting table stored in the ROM 91 or such.

The target value, however, is not limited to the one based on a table, but may be set on the basis of a function, a map or the like. Further, the target value may be set so as not to be changeable or so as to be capable of renewal, conversely, by an operation from the outside or the like.

Figure 9:
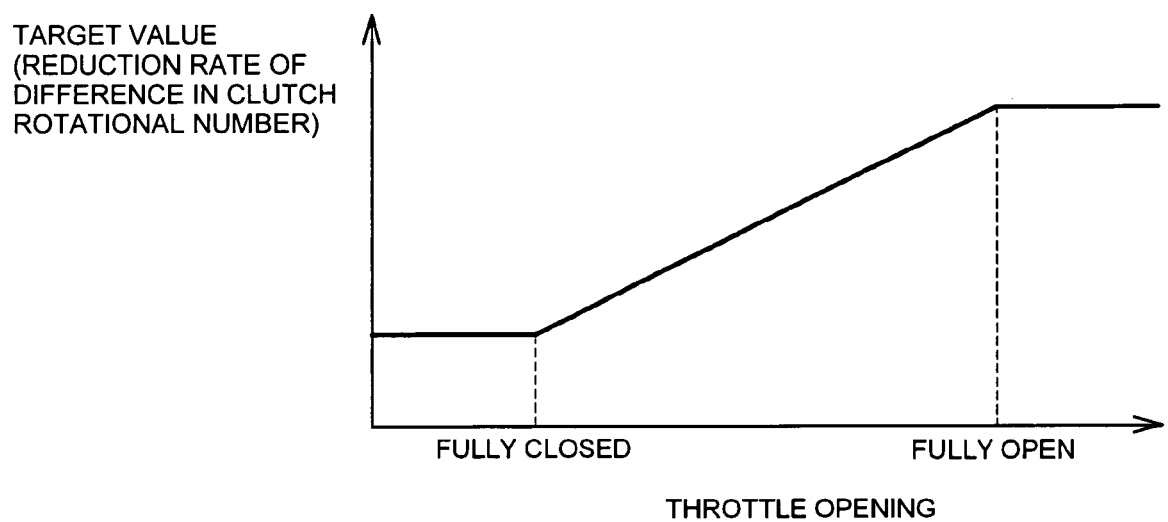
FIG. 9 shows an example of a target value setting table.

FIG. 9 is a graph showing an exemplary but non-limiting target value setting table. In FIG. 9, the horizontal axis represents the throttle opening and the vertical axis represents the target value to be set. As shown in FIG. 9, in the motorcycle 10, the larger the throttle opening detected by the throttle opening sensor 50 is, the larger the target value is.

After the process in Step S210, a process of obtaining the engine rotational number can then be performed in Step S220. For example, the ECU 100 can obtain a result of the detection by the engine rotational number sensor 53 to obtain the engine rotational number, which can be referred to as "the rotational number" of the crankshaft 52 or the "engine speed". After the process in Step S220, and the routine can move on to a Step S230.

In the Step S230, a process of obtaining the rotational number of the driving shaft can be carried out. For example, the ECU 100 can obtain a result of the detection by the vehicle speed sensor 69 to obtain the rotational number of the driving shaft 58. After the Step S230, the routine can move on to a Step S240.

In the Step S240, a process of calculating the rotational number of the main shaft can be performed. For example, the ECU 100 can calculate the rotational number of the main shaft 55 on the basis of the rotational number of the driving shaft 58, which is obtained in the above-mentioned process in Step S230. Additionally, a reduction rate can be obtained from a current state of the transmission gears. After the Step S240, the routine can move on to a Step S250.

In the Step S250, a process of calculating a difference in clutch rotational number can be performed. For example, the ECU 100 can perform a process of calculating a difference in clutch rotational number on the basis of the engine rotational number obtained in the above-mentioned process in Step S220 and the rotational number of the main shaft calculated in the process in Step S240. The difference in clutch rotational number can be obtained by calculating a difference between the engine rotational number and the rotational number of the main shaft. However, other methods can also be used for calculating the difference in clutch rotational number. After the Step S250, the routine can move on to a Step S260.

In the Step S260, an actual reduction rate can be calculated. The actual reduction rate can be a substantial reduction rate of the difference in clutch rotational number obtained on the basis of actual results of the detection by the engine rotational number sensor 53 and the vehicle speed sensor 69. For example, the ECU 100 can calculate the actual reduction rate on the basis of the difference in clutch rotational number calculated in the process in Step S250 and the difference in clutch rotational number calculated in the process in Step S250 having been executed predetermined time before. After the Step S260, the routine can move on to a Step S270.

In the Step S270, a process of setting a clutch connecting speed can be performed. For example, the ECU 100 can set the speed for connecting the clutch 54 on the basis of the target value set in the process in Step S210, the actual reduction rate calculated in the process in Step S260 and a connecting speed setting table stored in the ROM 91 or the like. However, other methods can also be used for setting the clutch connecting speed. After the Step S270, the routine can move on to a Step S280.

Figure 10:
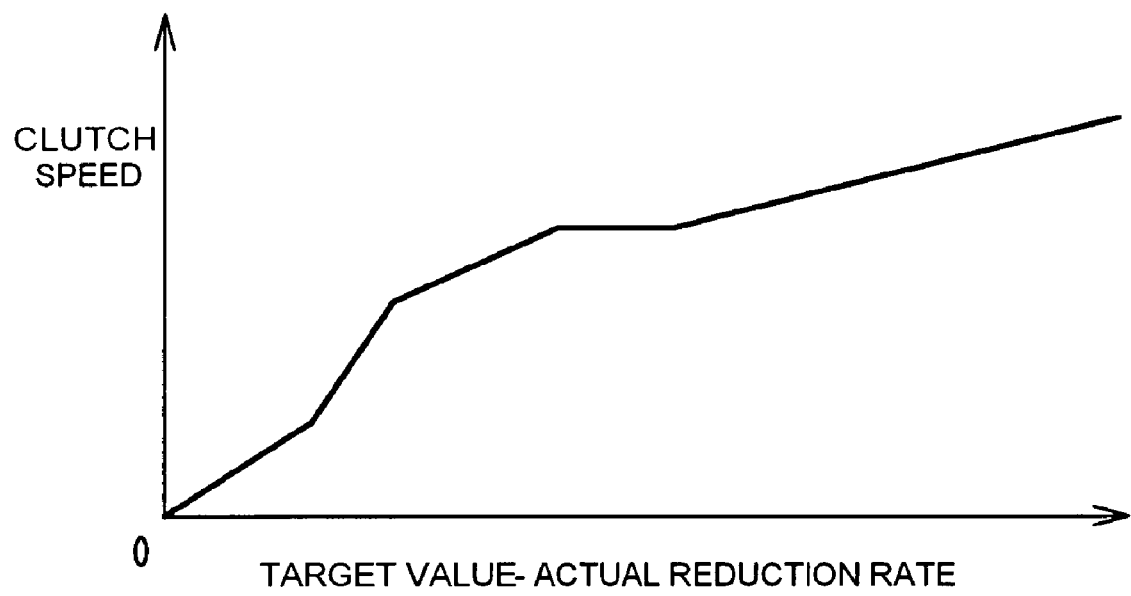
FIG. 10 shows an example of a connecting speed setting table.

However, with reference to FIG. 10, the process of setting a clutch speed can utilize predetermined data, such as a map or a table. For example, FIG. 10 illustrates exemplary data that can be used in the clutch speed setting process.

In FIG. 10, the horizontal axis represents the difference between the target value set in the process in Step S210 and the actual reduction rate calculated in the process in Step S260. The vertical axis represents the speed for connecting the clutch 54. As shown in FIG. 10, in some embodiments of the motorcycle 10, the larger the difference between the target value and the actual reduction rate is, the larger the clutch connecting speed to be set is. However, other relationships can also be used. Additionally, although the general relationship noted above may be true for some values, ranges of values, or portions of the data, other relationships may also be true for other values, ranges of values or portions of the data, some examples of which are illustrated in the exemplary data of FIG. 10.

In the Step S280, connection of the clutch can be started. For example, the ECU 100 can supply the clutch actuator 63 with a driving signal to make the clutch actuator 63 connect the clutch 54 at the clutch connecting speed set in the process in Step S270. After the process is executed, connection of the clutch 54 is started at the clutch connecting speed set in the process in Step S270. After the Step S280, the routine can move on to a Step S290.

In the Step S290, it can be determined whether or not the difference in clutch rotational number reaches the predetermined value or less. For example, the ECU 100 can judge whether or not the difference in clutch rotational number calculated in the process in Step S250 reaches the predetermined value or less. When it is judged that the difference in clutch rotational number does not reach the predetermined value or less, the process is returned to Step S200 to execute the processes from Step S200 to Step S280 again. On the other hand, in the case that the difference in clutch rotational number reaches the predetermined value or less, the half-clutch controlling process is completed.

As shown in FIG. 8, in the half-clutch controlling process, in some embodiments, the clutch connecting speed can be set on the basis of a difference between the target value of the reduction rate of the difference in clutch rotational number and the actual reduction rate of the difference in clutch rotational number. Control of connection of the clutch 54 based on the set clutch connecting speed can be repeated at predetermined time periods, however, other cycles for repetitions can also be used. The half-clutch control can be completed when the difference in clutch rotational number reaches the predetermined value or less, and then, the process can return to the process of connecting the clutch 54 (Step S160 in FIG. 7).

Figure 11:
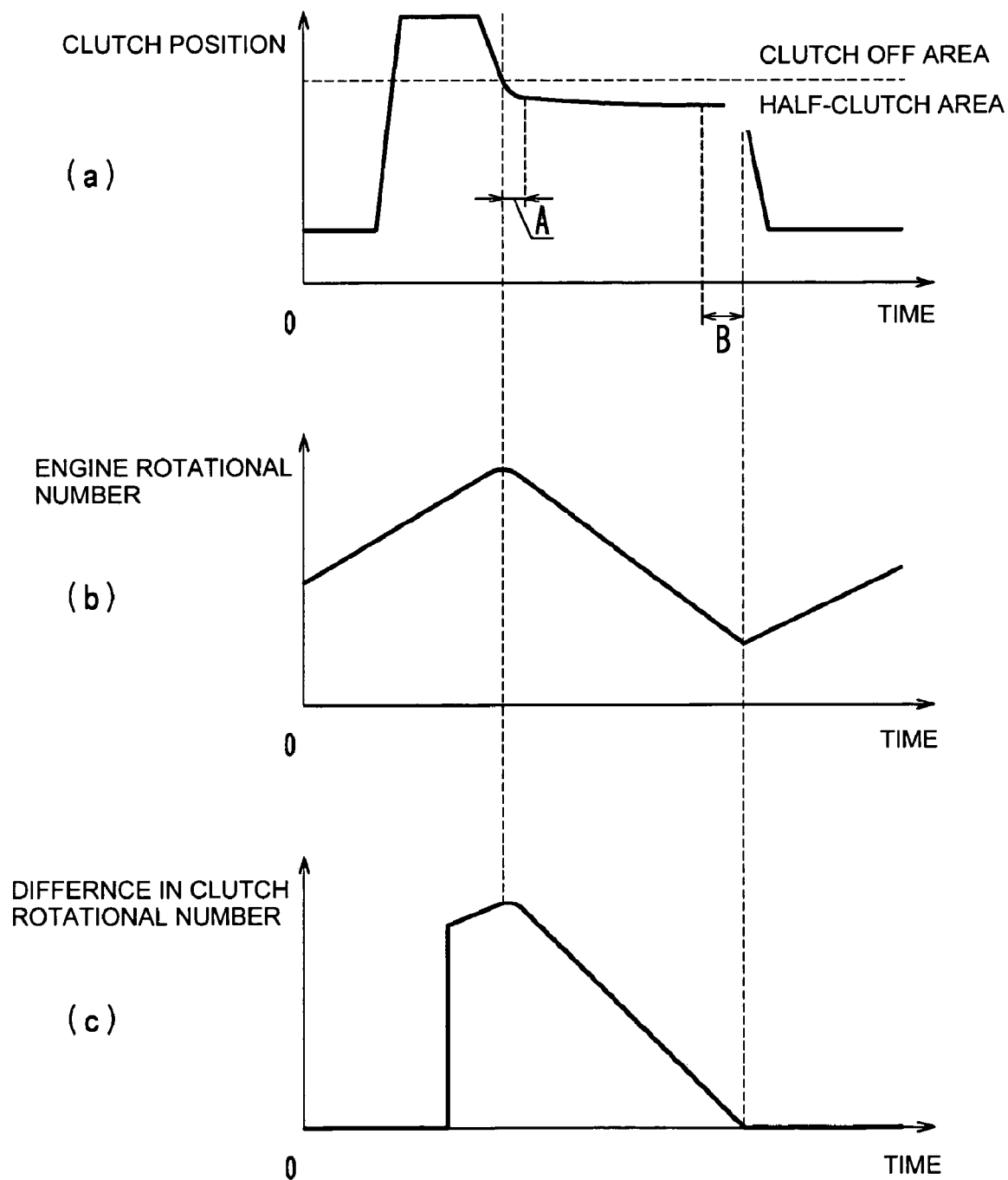
FIG. 11 shows a clutch position, an engine rotational number and a change in difference in clutch rotational number in accordance with the passage of time in executing the processes shown in FIGS. 7 and 8.

FIG. 11 illustrates exemplary relationships that can result from the gearshift controlling process of FIG. 7, and in particular, the clutch position, engine rotational number and change in difference in clutch rotational number in accordance with the passage of time in executing the half-clutch controlling process shown in FIG. 8.

The characteristics of FIGS. 11(*a*), (*b*), and (*c*) reflect a case where the throttle 47 (FIG. 2) is closed during a gearshift. FIG. 11(*a*) shows the change in the clutch position from the start to the end of the gearshift. FIG. 11(*b*) illustrates the change in engine rotational number in accordance with the passage of time from the start to the end of the gearshift. FIG. 11(*c*) illustrates the change in difference in clutch rotational number in accordance with the passage of time from the start to the end of the gearshift.

When the gearshift process is started, the clutch 54 is first disconnected at a high speed. When the clutch 54 enters a state of disconnection, the clutch is held at that clutch position. The half-clutch control is then performed when the completion of the gearshift is detected by means of the gear position sensor 70 while the clutch position in the disconnection state is maintained.

In the half-clutch control, the engine rotational number increases since engine driving force to be transmitted to the main shaft 55 is small when the clutch position moves from a clutch off area to a half-clutch area. The difference in clutch rotational number also increases simultaneously.

At that time, the target value can be a constant value since the throttle opening is not changed as described above (FIG. 9). The actual reduction rate, however, can be a small value (a negative number) since the difference in clutch rotational number is increased. The actual reduction rate is a value, which is positive when the difference in clutch rotational number is decreasing and negative when the difference in clutch rotational number is increasing. Accordingly, the difference between the target value and the actual reduction rate becomes large, so that a large value of clutch connecting speed is set (FIG. 10). Therefore, at a starting time of the half-clutch (an area A in the drawing), the clutch 54 can be rapidly connected. The difference between the target value and the actual reduction rate becomes substantially 0 when the difference in clutch rotational number decreases during the half-clutch control and the actual reduction rate becomes substantially equal to the target value. Accordingly, the clutch connecting speed is also set at substantially 0 (FIG. 10). This allows the clutch position to be held so that the clutch position would be substantially fixed at a time when the half-clutch is completed (an area B in the drawing).

As described above, in some embodiments of the motorcycle 10, the speed for connecting the clutch 54 is controlled so that the actual reduction rate of the difference in clutch rotational number would approach the target value. This allows the clutch 54 to be smoothly connected in the half-clutch process. As a result, the feeling in a ride can be improved.

Figure 12:
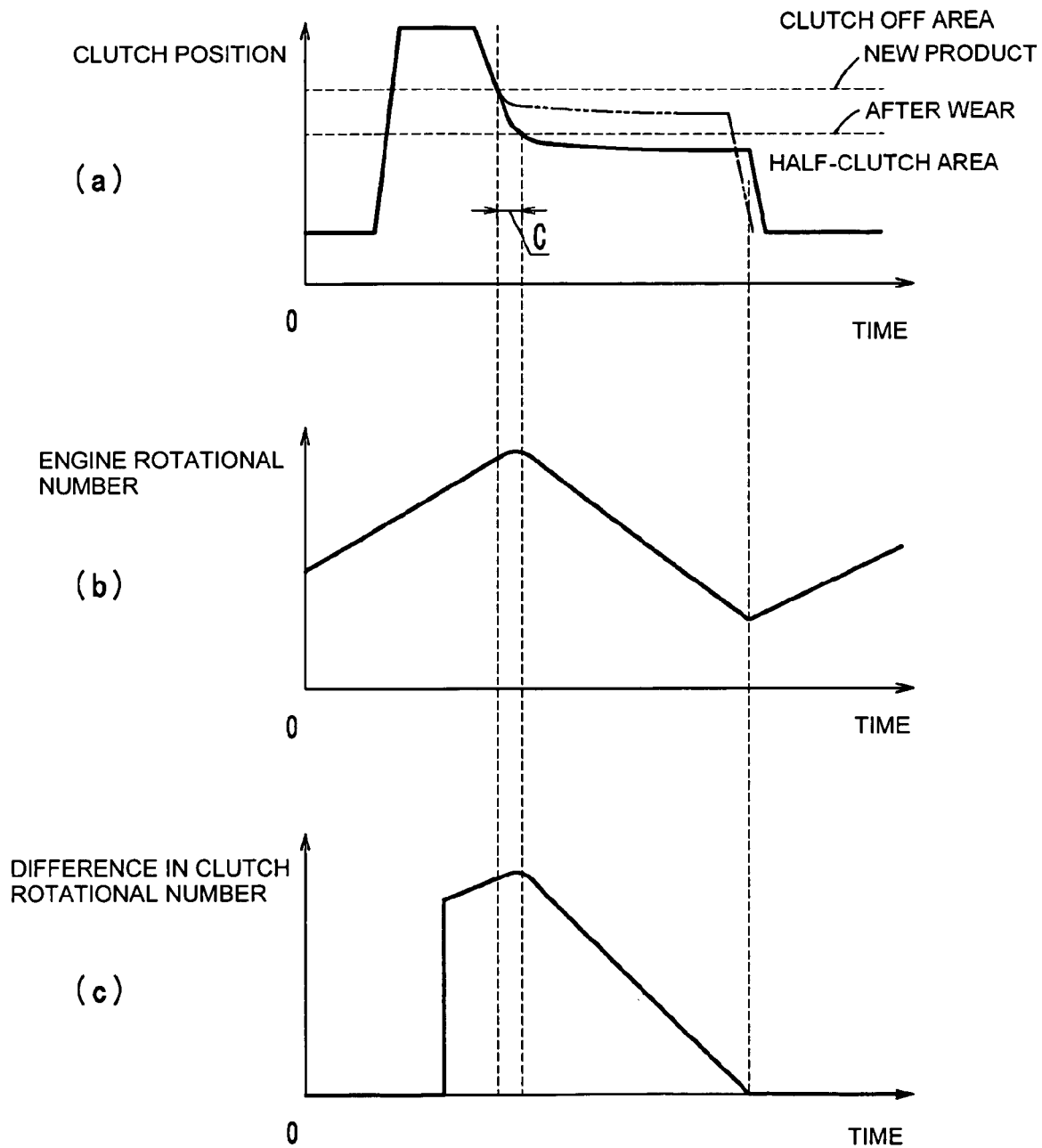
FIG. 12 shows a clutch position, an engine rotational number and a change in difference in clutch rotational number in accordance with the passage of time in executing the processes shown in FIGS. 7 and 8.

FIG. 12 illustrates a case of wear of the clutch 54 due to use of the motorcycle 10 or the like. As shown in FIG. 12(*a*), wear of the clutch 54 causes shift of a border between a clutch area and a half-clutch area to the clutch connecting side (the lower side in the drawing). In FIG. 12(*a*), the change in clutch position according to the passage of time in the case that the clutch 54 is a new product is shown by a double dotted line.

When the border between the clutch area and the half-clutch area is shifted to the clutch connecting side, a distance for connecting the clutch 54 to the half-clutch area becomes large, and thereby, the engine rotational number greatly increases in accordance with the distance. At that time, the actual reduction rate becomes small in value (a negative number), and therefore, the difference between the target value and the actual reduction rate becomes large in value, so that a large value of clutch connecting speed is set (FIG. 10). That is to say, the clutch 54 is rapidly connected during a time for reaching the border in the wear (an area C in the drawing) in the case of wear of the clutch 54.

As described above, in some embodiments of the motorcycle 10, the clutch 54 is arranged to be rapidly connected before reaching the half-clutch area even in the case that the clutch 54 is worn. This allows empty running of the vehicle to be reduced during the half-clutch control in the case of wear of the clutch 54, and thus, the clutch 54 can be smoothly connected. As a result, the feeling in a ride can be improved.

Figure 13:
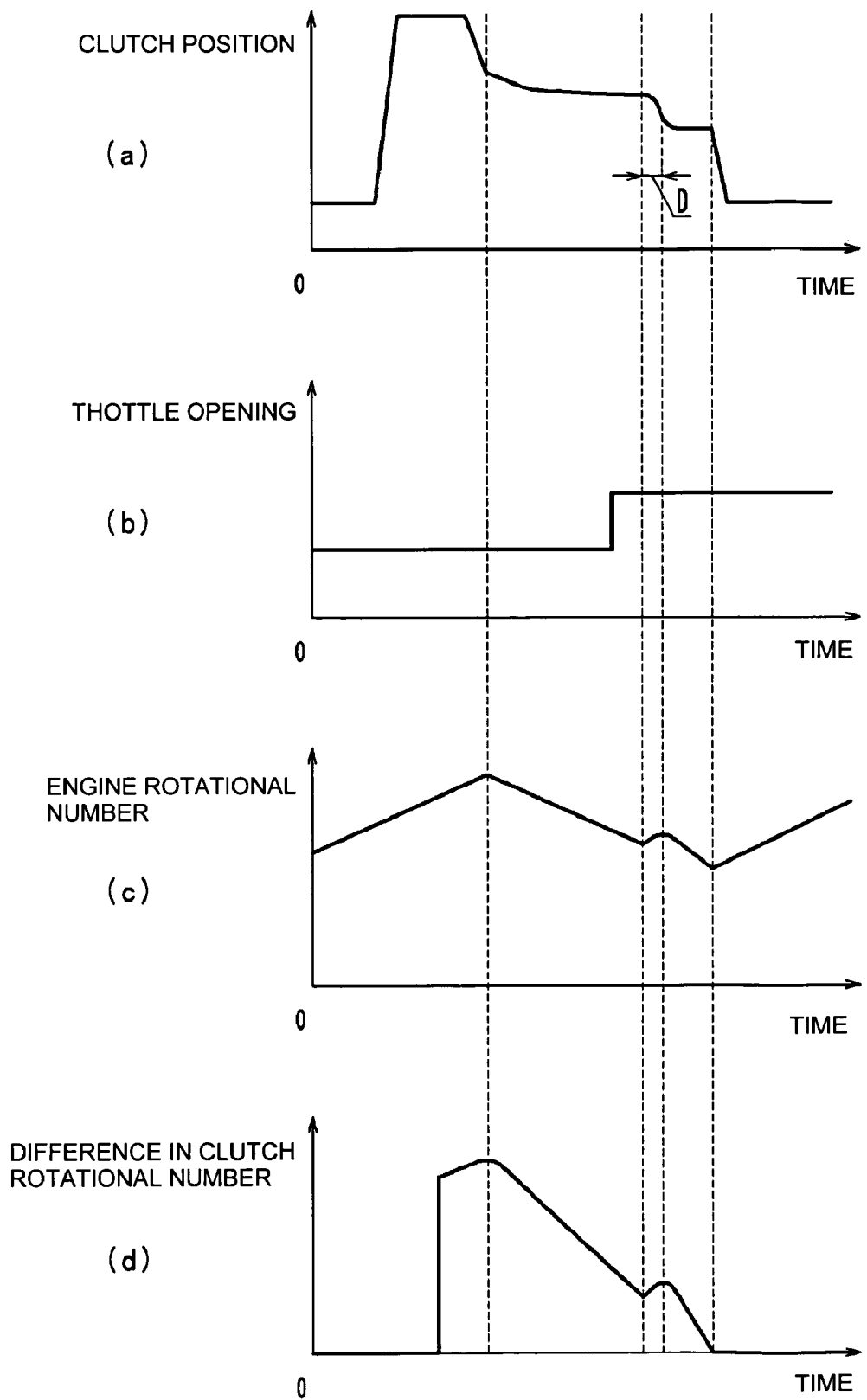
FIG. 13 shows a clutch position, a throttle opening, an engine rotational number and a change in difference in clutch rotational number in accordance with the passage of time in executing the processes shown in FIGS. 7 and 8.

FIG. 13 illustrates a case that an operation of the accelerator is carried out during the half-clutch control and the throttle opening is increased. FIG. 13(a) shows the change in clutch position in accordance with the passage of time from the start to the end of the gearshift. FIG. 13(b) shows the change in throttle opening in accordance with the passage of time from the start to the end of the gearshift. FIG. 13(c) shows the change in engine rotational number in accordance with the passage of time from the start to the end of the gearshift. FIG. 13(d) shows the change in difference in clutch rotational number in accordance with the passage of time from the start to the end of the gearshift.

When the operation of the accelerator is carried out during the half-clutch control and the throttle opening is increased, the engine rotational number also increases in accordance with the above. Increase of the engine rotational number causes increase of the difference in clutch rotational number. At that time, the target value to be set is higher than that of the case of performing no operation of the accelerator since the throttle opening increases (refer to FIG. 9). The actual reduction rate of the difference in clutch rotational number becomes small (a negative number) since the difference in clutch rotational number increases. This results in a large value of difference between the target value and the actual reduction rate, so that a large value of clutch connecting speed is set (refer to FIG. 10). Accordingly, the clutch 54 is rapidly connected during the operation of the accelerator and the increase of the engine rotational number (in an area D in the drawing).

As described above, in some embodiments of the motorcycle 10, the clutch 54 is arranged to be rapidly connected when an operation of the accelerator is carried out during the half-clutch control and the throttle opening becomes large. Accordingly, the vehicle speed performance of following the operation of the accelerator is improved. This results in improvement in feeling in a ride.

As described above, in some embodiments of the motorcycle 10, the speed for connecting the clutch 54 is set so that the actual reduction rate of the difference in clutch rotational number would approach the target value in the half-clutch control, so that the clutch 54 can be connected smoothly. This allows the feeling in a ride to be improved.

Further, in some embodiments of the motorcycle 10, the larger the difference between the target value of the reduction rate of the difference in clutch rotational number and the actual reduction rate of the difference in clutch rotational number is, the larger a value of the speed for connecting the clutch 54 to be set is. Accordingly, the clutch 54 can be smoothly connected even in the case of wear of the clutch 54 or an individual variation of the clutch 54. This allows the feeling in a ride to be improved.

Moreover, in some embodiments of the motorcycle 10, the larger the throttle opening detected by means of the throttle opening sensor 50 is, the higher the target value to be set is. This allows the vehicle speed performance of following the operation of the accelerator to be improved in the case that the operation of the accelerator is carried out during the half-clutch control. This results in improvement in feeling in a ride.

In some embodiments, as described above, the actual reduction rate can be calculated on the basis of the engine rotational number detected by means of the engine rotational number sensor 53 and the rotational number of the main shaft calculated on the basis of a result of the detection by means of the vehicle speed sensor 69. A method of calculating the actual reduction rate, however, is not limited to that process. Other processes can also be used.

For example, a wheel rim of the rear wheel 26, which is used as a driving wheel, can be provided with a wheel rotational number sensor for detecting the wheel rotational number (not shown) to calculate the rotational number of the main shaft on the basis of the wheel rotational number detected by means of the wheel rotational number sensor. A speed-reduction ratio can be obtained from the current state of the transmission gears and a speed-reduction ratio of the driving shaft 58 and the rear wheel 28. The difference in clutch rotational number can be calculated on the basis of the calculated rotational number of the main shaft and the engine rotational number detected by means of the engine rotational number sensor 53 to calculate the actual reduction rate on the basis of the calculated difference in clutch rotational number. In this case, the speed-reduction ratio of the driving shaft 58 and the rear wheel 28 can be measured in advance to be stored in the ROM 91 or the like. The speed-reduction ratio of the driving shaft 58 and the rear wheel 28 can be constant as mentioned above. Accordingly, the rotational number of the main shaft can be calculated substantially on the basis of the speed-reduction ratio obtained from the wheel rotational number and the current state of the transmission gears.

Furthermore, a difference between the engine rotational number and the rotational number of the main shaft can be calculated on the basis of the engine rotational number detected by means of the engine rotational number sensor 53 and the rotational number of the main shaft detected by means of the main shaft rotational number sensor 56 to calculate the difference in clutch rotational number on the basis of which the actual reduction rate is calculated, for example.

In the case that the rotational number of the main shaft is calculated on the basis of a result of the detection of the vehicle speed sensor 69, the main shaft rotational number sensor 56 can be omitted. It some embodiments, the actual reduction rate can be obtained only on the basis of a result of detection by means of the engine rotational number sensor 53 since increase and decrease in engine rotational number are substantially accorded with increase and decrease in difference in clutch rotational number (see FIGS. 11 to 13).

Moreover, in some embodiments, the target value setting table can be used to defining a relation between the throttle opening and the target value. In the description set forth above, however, the motorcycle 10 is configured so that the target value would be set on the basis of the throttle opening. The inventions disclosed herein, however, are not limited to such arrangements. Rather, the target value setting table can be used define a relation between the engine rotational number and the target value and a saddle riding type vehicle can be arranged so that the target value would be set on the basis of the engine rotational number, for example. However, other techniques can be used to define a relation between the throttle opening and the target value.

In addition, in some embodiments, a plurality of different kinds of connection speed setting tables can also be stored. For example, a plurality of different kinds of connection speed setting tables corresponding to a stage of the transmission gears to which the gear is shifted may be stored or two kinds of connection speed setting table respectively corresponding to up-shifts and down-shifts can also be stored.

In some embodiments, the clutch connecting speed can be set on the basis of the actual reduction rate of the engine rotational number (also referred to as an actual rotational number reduction rate, hereinafter) and the target value of the reduction rate of the engine rotational number (also referred to as a target value simply, hereinafter) in the half-clutch control.

Figure 14:
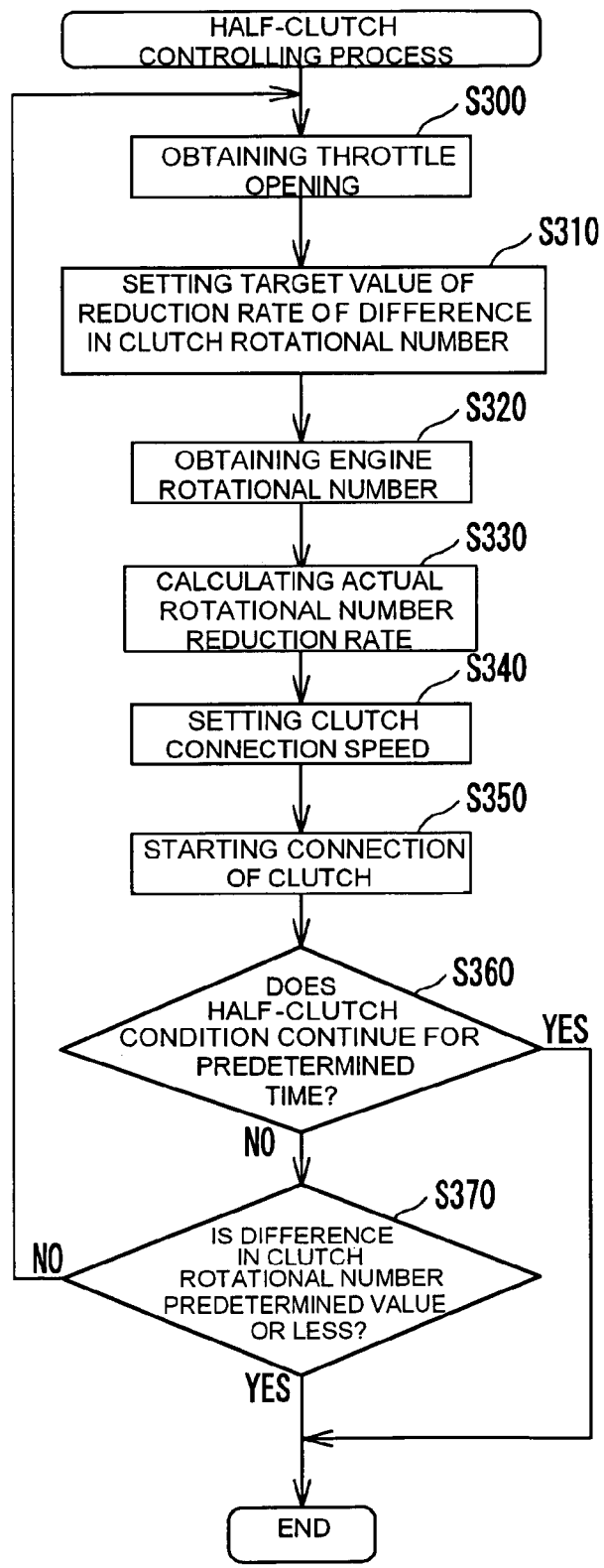
FIG. 14 is a flowchart showing another half-clutch control process.

FIG. 14 is a flowchart showing a half-clutch control process using such a technique. The respective devices and members, which form the motorcycle in such embodiments, are similar to those of the motorcycle 10 described above with reference to FIGS. 1-13. Accordingly, the description thereof will be omitted.

When the half-clutch control process of FIG. 14 is started at Step S300, a process of obtaining the throttle opening can be performed. The process used, can be for example, can be the same or similar to that of Step S200 in the half-clutch control process shown in FIG. 8.

After the process in Step S300 is executed, the target value of the reduction rate of the engine rotational number can then be set in Step S310. In this process, the ECU 100 can perform a process of setting the target value of the reduction rate of the rotational number of the engine included in the engine unit 28. The target value is set on the basis of the target value setting table stored in the ROM 91 or such.

Figure 15:
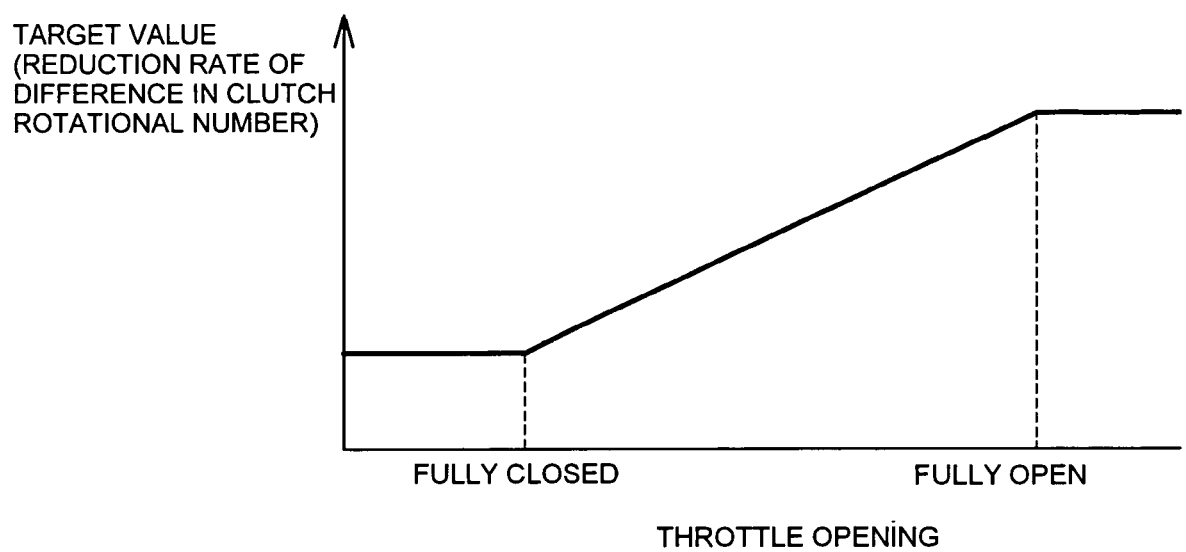
FIG. 15 shows an example of a target value setting table that can be used with the process illustrated in FIG. 14.

FIG. 15 shows an example of a target value setting table that can be used in the process in Step S310. In FIG. 15, the horizontal axis represents the throttle opening while the vertical axis represents the target value to be set. As shown in FIG. 15, the larger the throttle opening detected by means of the throttle opening sensor 50 is, the larger the target value to be set is.

After the process in Step S310 is executed, a process of obtaining the engine rotational number is then performed in Step S320. A further description of this process is not repeated since this process can be the same or similar to the process in Step S220 in the flowchart shown in FIG. 8.

After the process in Step S320 is executed, the actual rotational number reduction rate can then be calculated in Step S330. The actual rotational number reduction rate can be a substantial reduction rate of the engine rotational number and can be obtained on the basis of an actual result of the detection by means of the engine rotational number sensor 53. In this process, for example, the ECU 100 can calculate the actual rotational number reduction rate on the basis of the engine rotational number obtained in the process in Step S320 and the engine rotational number obtained in the process in Step S320 having been executed predetermined time before.

After the process in Step S330 is executed, a process of setting a clutch connecting speed can then be performed in Step S340. In this process, for example, the ECU 100 can set the speed for connecting the clutch 54 on the basis of the target value set in the process in Step S310, the actual rotational number reduction rate calculated in the process in Step S330 and a connecting speed setting table stored in the ROM 91 or such.

Figure 16:
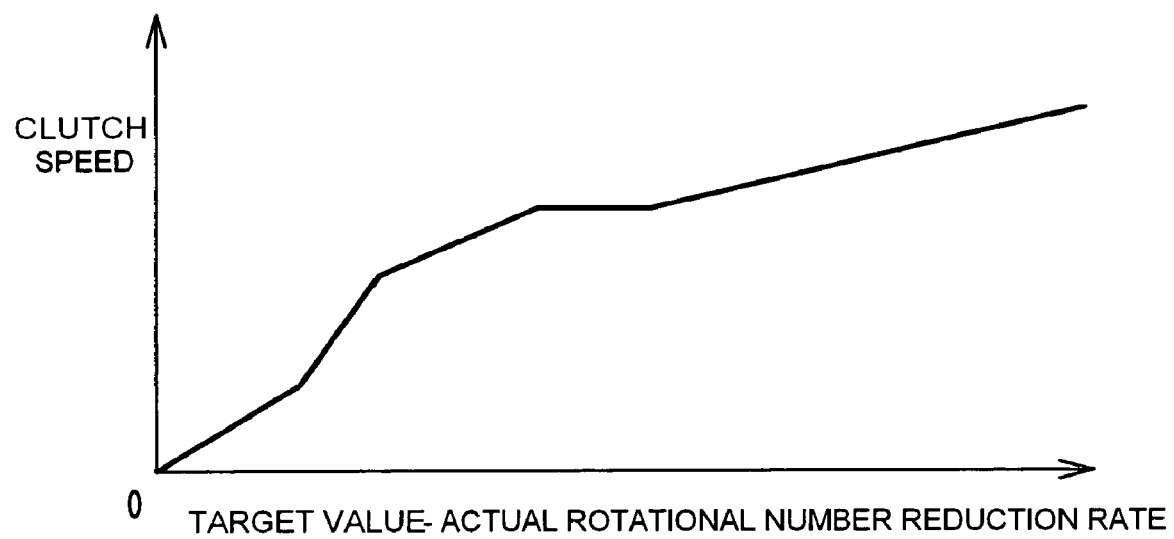
FIG. 16 shows an example of a connecting speed setting table that can be used with the process illustrated in FIG. 14.

FIG. 16 shows an example of the connecting speed setting table that can also be used. In FIG. 16, the horizontal axis represents the difference between the target value set in the process in Step S310 and the actual rotational number reduction rate calculated in the process in Step S330 while the vertical axis represents the speed for connecting the clutch 54. As show in FIG. 16, in the motorcycle, in some embodiments, the larger the difference between the target value and the actual rotational number reduction rate is, the larger the clutch connecting speed to be set is. However, as noted above with reference to FIG. 10, although the above noted general description of this relationship may be true for some of the data, other relationships can also hold true for other portions of the data.

After the process in Step S340 is executed, connection of the clutch can then be started in Step S350. In this step, the ECU 100 controls the clutch actuator 63 to connect the clutch 54 at the clutch connecting speed set in the process in Step S340. After the Step S350, the routine can move to a Step S360.

In the Step S360, it can be determined whether or not the predetermined half-clutch condition has been continued for predetermined time. In some embodiments, the predetermined half-clutch condition is set at a condition that the difference between the target value and the actual rotational number reduction rate is within a predetermined range and that the reduction rate of the difference in clutch rotational number is a predetermined value or less. For example, the ECU 100 can determine whether or not the half-clutch condition has been continued for predetermined time. The ECU 100 can complete the half-clutch control process when it is determined that the half-clutch condition has been continued for predetermined time.

The judgment on continuance of the half-clutch condition is not limited to the one based on elapse of time but can be based on physical quantity equivalent to the time. It can be based on physical quantity varying in a single meaning in accordance with progress of a phenomenon. For example, the judgment on continuance of the half-clutch condition can be on the basis of a total value of the engine rotational number or such. Elapsed time is short in the case that the engine rotational number is large while it is long in the case of small engine rotational number even when the total value of the engine rotational number is same. Accordingly, the total value of the engine rotational number is not necessarily accorded with the elapsed time. The "continuance" in the above context, however, may be on the basis of such a total value of the engine rotational number or the like.

On the other hand, in the case that the half-clutch condition is not judged to have been continued for predetermined time in Step S360, it is judged in Step S370 that the difference in clutch rotational number reaches a predetermined value or less. When it is judged that the difference in clutch rotational number does not reach the predetermined value or less, the process is returned to Step S300. On the other hand, the half-clutch controlling process is completed when the difference in clutch rotational number is judged to reach the predetermined value or less.

As described above, the speed for connecting the clutch 54 can be set so that the reduction rate of the engine rotational number would approach to the target value in the half-clutch control. This allows the clutch 54 to be smoothly connected, so that an effect that the feeling in a ride can be improved similarly to the other embodiments disclosed herein.

As described above with reference to FIGS. 14-16, in the case of controlling the clutch connecting speed with the actual rotational number reduction rate being referred to, the difference in clutch rotational number is likely not to be reduced in accordance with reduction of the engine rotational number although the engine rotational number has been reduced, depending on the condition of the vehicle, even when the actual rotational number reduction rate is close to the target value.

As an example of such a case, the brakes can be slammed just after a shift-up operation with the accelerator pressed on an ascent. The actual rotational number reduction rate is increased slowly so as to approach the target value after suddenly braking (the engine rotational number is decreased) while the vehicle speed falls suddenly. As a result, the speed of decreasing in rotational number of the main shaft becomes larger than that of the engine rotational number, so that the difference in clutch rotational number increases. That is to say, the difference in clutch rotational number increases although the engine rotational number decreases. In such a condition, the actual rotational number reduction rate is substantially equal to the target value and the clutch connecting speed is substantially 0 (refer to FIG. 16). Accordingly, the difference in clutch rotational number increases while the clutch position is maintained. This causes the half-clutch condition to last long time without moving the process to the clutch connecting process (Step S160, FIG. 7).

In some embodiments, as disclosed above, whether the continuance of the half-clutch condition is maintained for the predetermined time is determined on the basis of the reduction rate of the engine rotational number and the reduction rate of the difference in clutch rotational number in the process of Step S360 in the half-clutch controlling process shown in FIG. 14 and the half-clutch control be completed to move the process to the clutch connecting process (Step S160, FIG. 7) when the half-clutch condition is judged to have been continued for the predetermined time. Accordingly, the half-clutch condition can be prevented from lasting long time although the engine rotational number is reduced. The clutch 54 is preferably connected at a low speed in the clutch connecting process after the half-clutch condition is judged to, have been continued for the predetermined time. This is because a shock can be reduced in connecting the clutch.

In some embodiments disclosed above, one kind of connection speed setting table is stored. Plural kinds of connection speed setting table, however, may also be stored. For example, it is possible to store plural kinds of connection speed setting table corresponding to a stage of the transmission gears to which the gear is shifted or to store two kinds of connection speed setting table respectively corresponding to shift-up and shift-down.

Although the present inventions have been described in terms of certain embodiments, other embodiments apparent to those of ordinary skill in the art also are within the scope of these inventions. Thus, various changes and modifications may be made without departing from the spirit and scope of the inventions. For instance, various components may be repositioned as desired. Moreover, not all of the features, aspects and advantages are necessarily required to practice the present inventions.

What is claimed is:

1. An automatic gearshift control device comprising:
   a friction clutch provided between a driving side power transmission mechanism and a driven side power transmission mechanism;
   a transmission;
   an automatic gearshift device including an electrically-driven actuator configured to control engagement of the friction clutch and for shifting gears of the transmission;
   a reduction rate obtaining device configured to obtain a reduction rate of a difference in clutch rotational number defined on the basis of a difference between the driving side rotational number and the driven side rotational number, the driving side rotational number being a rotational number of a driving side part of the friction clutch or the driving side power transmission mechanism and the driven side rotational number being a rotational number of a driven side part of the friction clutch or the driven side power transmission mechanism;
   a connecting speed setting device configured to set a speed for connecting the friction clutch so that the reduction rate of the difference in clutch rotational number, the reduction rate being obtained by means of the reduction rate obtaining device, would reach a predetermined target value; and
   a control device configured to control drive of the actuator so as to connect the friction clutch at the connection speed set with the connecting speed setting device.

2. The automatic gearshift control device according to claim 1, wherein the larger the difference between the target value and the reduction rate of the difference in clutch rotational number the larger the connecting speed setting device sets the speed for connecting the friction clutch, wherein the reduction rate is obtained by the reduction rate obtaining device.

3. The automatic gearshift control device according to claim 1, comprising:
   a throttle opening detecting device configured to detect a throttle opening;
   wherein the target value is set in accordance with the throttle opening detected by means of the throttle opening detecting device.

4. The automatic gearshift control device according to claim 3, wherein the larger the throttle opening detected by the throttle opening detecting device is, the higher the target value is set.

5. The automatic gearshift control device according to claim 1, including an engine provided on the driving side of the friction clutch and a main shaft provided on the driven side of the friction clutch, the automatic gearshift control device comprising:
   an engine rotational number obtaining device configured to obtain an engine rotational number; and
   a main shaft rotational number obtaining device configured to obtain a main shaft rotational number;
   wherein the reduction rate obtaining device is configured to calculate the reduction rate of the difference in clutch rotational number on the basis of the engine rotational number obtained by the engine rotational number obtaining device and the main shaft rotational number obtained by the main shaft rotational number obtaining device.

6. The automatic gearshift control device according to claim 5, wherein the engine includes a crankshaft and the engine rotational number obtaining device is an engine rotational number sensor configured to detect a rotational number of the crankshaft of the engine.

7. The automatic gearshift control device according to claim 5, wherein the main shaft rotational number obtaining device is a main shaft rotational number sensor provided on the main shaft.

8. The automatic gearshift control device according to claim 5, wherein the main shaft is connected to a driving shaft through the transmission and the main shaft rotational number obtaining device includes a vehicle speed sensor provided on the driving shaft and is configured to calculate a main shaft rotational number on the basis of the drive shaft rotational number detected by the vehicle speed sensor and the stage of gears in the transmission.

9. The automatic gearshift control device according to claim 5, the automatic gearshift control device in combination with and mounted to a vehicle including a driving wheel, wherein the main shaft rotational number obtaining device comprises a driving wheel rotational number sensor configured to detect the rotational number of the driving wheel to calculate the main shaft rotational number on the basis of the rotational number of the driving wheel detected by means of the driving wheel rotational number sensor and the stage of gears in the transmission.

10. The automatic gearshift control device according to claim 1, in combination with a vehicle comprising the automatic gearshift control device according.

11. The automatic gearshift control device according to claim 10, wherein the vehicle is a saddle riding type vehicle.

12. An automatic gearshift control device mounted to a vehicle including an engine, the automatic gearshift control device comprising:

a friction clutch;

a transmission;

an automatic gearshift device including an electrically-driven actuator configured to control engagement of the friction clutch and configured to shift gears of the transmission;

a rotational number reduction rate obtaining device configured to obtain the reduction rate of the engine rotational number;

a connecting speed setting device configured to set a speed for connecting the friction clutch so that the reduction rate of the engine rotational number obtained by the rotational number reduction rate obtaining device would reach a predetermined target value; and a control device configured to control drive of the actuator so as to connect the friction clutch at the connection speed set by means of the connecting speed setting device.

13. The automatic gearshift control device according to claim 12, wherein the friction clutch is provided between a driving side power transmission mechanism and a driven side power transmission mechanism and the control device is configured to stop setting the connection speed by the connection speed setting device to control drive of the actuator so as to connect the friction clutch when a condition that a difference between the target value and the reduction rate of the engine rotational number obtained by means of the rotational number reduction rate obtaining device is within a predetermined range and the reduction rate of a difference in clutch rotational number is a predetermined value or less is continued, wherein a difference between a driving side rotational number and a driven side rotational number, the driving side rotational number being a rotational number of a driving side part of the friction clutch or the driving side power transmission mechanism and the driven side rotational number being a rotational number of a driven side part of the friction clutch or the driven side power transmission mechanism, is the difference in clutch rotational number.

14. The automatic gearshift control device according to claim 12, in combination with a vehicle comprising the automatic gearshift control device according.

15. The automatic gearshift control device according to claim 14, wherein the vehicle is a saddle riding type vehicle.

* * * * *